United States Patent
Kobayashi et al.

(10) Patent No.: US 9,762,057 B2
(45) Date of Patent: Sep. 12, 2017

(54) CONTROL COMMAND APPARATUS, POWER SYSTEM CONTROL SYSTEM AND CONTROL COMMAND METHOD

(71) Applicant: HITACHI, LTD., Tokyo (JP)

(72) Inventors: Hideyuki Kobayashi, Tokyo (JP); Masahiro Watanabe, Tokyo (JP)

(73) Assignee: Hitachi, Ltd., Tokyo (JP)

(*) Notice: Subject to any disclaimer, the term of this patent is extended or adjusted under 35 U.S.C. 154(b) by 329 days.

(21) Appl. No.: 14/655,957

(22) PCT Filed: Dec. 29, 2012

(86) PCT No.: PCT/JP2012/084246
§ 371 (c)(1),
(2) Date: Jun. 26, 2015

(87) PCT Pub. No.: WO2014/103082
PCT Pub. Date: Jul. 3, 2014

(65) Prior Publication Data
US 2015/0340862 A1 Nov. 26, 2015

(51) Int. Cl.
*H02J 3/00* (2006.01)
*G05B 15/02* (2006.01)

(52) U.S. Cl.
CPC ............ *H02J 3/00* (2013.01); *G05B 15/02* (2013.01); *Y04S 10/18* (2013.01); *Y04S 20/48* (2013.01)

(58) Field of Classification Search
CPC .. H02J 3/00; G05B 15/02; Y04S 10/18; Y04S 20/48; Y02E 60/724
See application file for complete search history.

(56) References Cited

U.S. PATENT DOCUMENTS

| | | | | |
|---|---|---|---|---|
| 8,615,330 B2* | 12/2013 | Dong | ........................ | H02J 3/00 |
| | | | | 700/286 |
| 2002/0091503 A1* | 7/2002 | Carrillo | ............... | G06F 17/5004 |
| | | | | 703/2 |
| 2011/0035067 A1* | 2/2011 | Larsson | .................. | H02J 3/005 |
| | | | | 700/286 |

FOREIGN PATENT DOCUMENTS

JP 2008-118799 A 5/2008

OTHER PUBLICATIONS

Hideyuki Kobayashi and other four people, An Adjustment Control for LRT and SVR Parameters using Real-time Measurements, 2012 Annual Meeting record, I.E.E. Japan (CD-R), No. 6, 164th issue, p. 293-294.

* cited by examiner

*Primary Examiner* — Sean Shechtman
*Assistant Examiner* — Shon Foley
(74) *Attorney, Agent, or Firm* — Mattingly & Malur, PC

(57) ABSTRACT

A control command apparatus in a power system selecting a measuring apparatus according to a power system state, includes: a measuring apparatus extraction unit (112) extracting a measuring apparatus (2) between a first and second control apparatus (3) downstream the first control apparatus (3), or a measuring apparatus (2) downstream the first control apparatus (3) if no second control apparatus (2) exists, when a predetermined condition is satisfied, based on system configuration information (121), and generating measuring apparatus information (123) associating the extracted measuring apparatus (2) and the first control apparatus (3) with each other; and a control command generation unit (114) acquiring a measurement value from the measuring apparatus (2), identifying a control apparatus (3) associated with the measuring apparatus (2) as a the measurement value source based on the measuring apparatus (Continued)

information (123), and calculating and outputting a control parameter to the identified control apparatus (3).

13 Claims, 21 Drawing Sheets

| PAR-ID | CHLD-ID | UPDT |
|---|---|---|
| ⋮ | ⋮ | ⋮ |
| 800 | 210 | 09/13/2012/10:10:10 |
| 210 | 211 | 09/13/2012/10:10:10 |
| 210 | 212 | 09/13/2012/10:10:10 |
| 210 | 310 | 09/13/2012/10:10:10 |
| 310 | 214 | 09/13/2012/10:10:10 |
| 214 | 215 | 09/13/2012/10:10:10 |
| 215 | 311 | 09/13/2012/10:10:10 |
| 311 | 216 | 09/13/2012/10:10:10 |
| 214 | 217 | 09/13/2012/10:10:10 |
| 217 | 218 | 09/13/2012/10:10:10 |
| 801 | 213 | 09/13/2012/10:10:10 |
| 213 | 211 | 09/13/2012/10:10:10 |
| 802 | 219 | 09/13/2012/10:10:10 |
| 219 | 218 | 09/13/2012/10:10:10 |
| ⋮ | ⋮ | ⋮ |

125

| CA-ID | CTL-ULV | CTL-LLV | MAX-VAL | MIN-VAL |
|---|---|---|---|---|
| : | : | : | : | : |
| 311 | 6930 | 6270 | 6763 | 6435 |
| : | : | : | : | : |

123b

| CA-ID | MA-ID | CMPS-VAL |
|---|---|---|
| 310 | 214 | 1 |
| 310 | 215 | 1 |
| 310 | 216 | 0.974 |
| 310 | 217 | 1 |
| 310 | 218 | 1 |
| 311 | 216 | 1 |

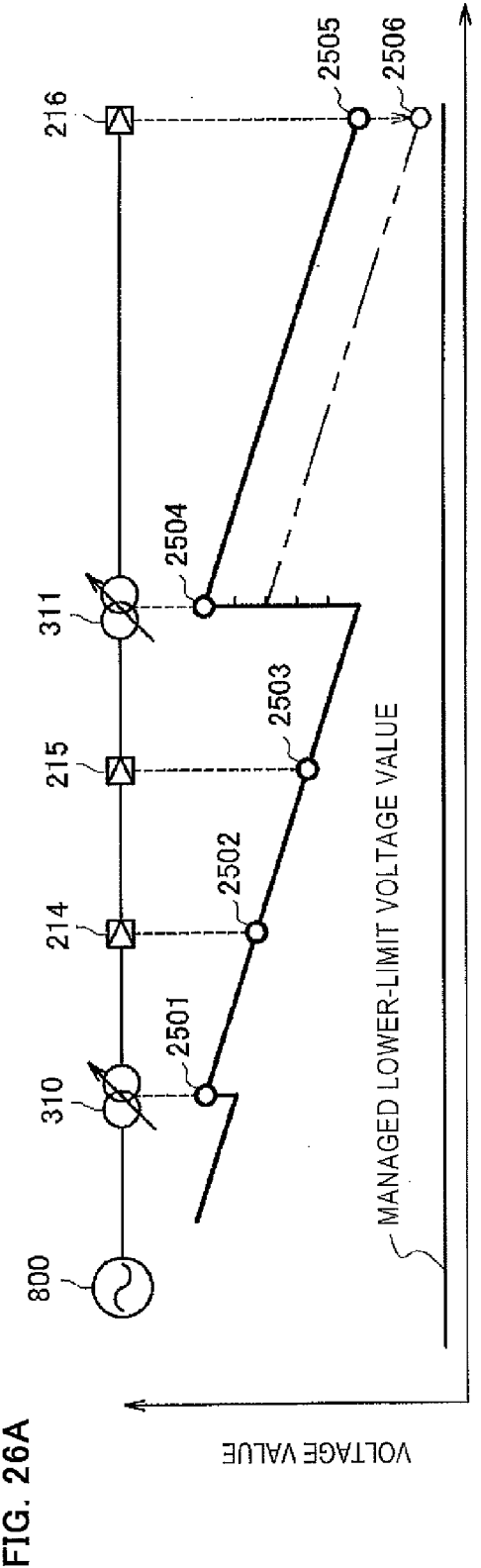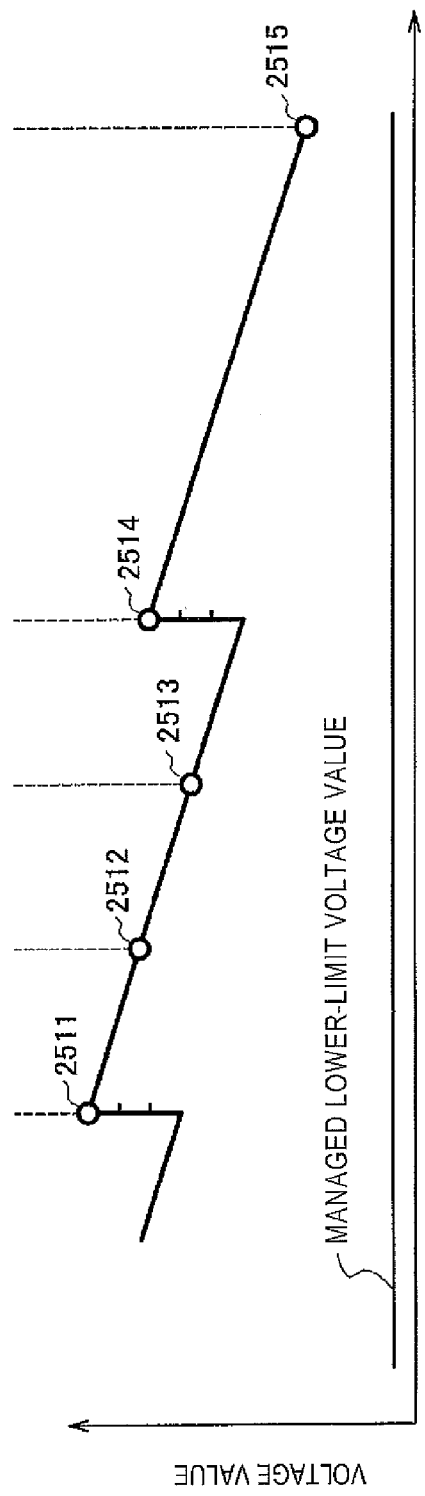
FIG. 26A
FIG. 26B

CONTROL COMMAND APPARATUS, POWER SYSTEM CONTROL SYSTEM AND CONTROL COMMAND METHOD

TECHNICAL FIELD

This invention relates to a technology of a control command apparatus, a power system control system, and a control command method for controlling a power system.

BACKGROUND ART

Recently, small-scale distributed power sources utilizing renewable energy (wind power generators, solar power generators, etc.) have been widespread. Power generated by these small-scale distributed power sources changes in response to climate changes. Further, the distributed installation of these small-scale distributed power sources may cause voltages to rise or fall locally in power systems. It is worried that, interconnection of the power sources utilizing the renewable energy largely changes the state of the power system every minute and causes degradation of the power quality. Accordingly, the future power system control is expected to predominantly use a method of obtaining the system state using measurement values acquired from measuring apparatuses (sensors) installed at the respective spots of the power system to determine control parameters.

On the above-mentioned background, NPL 1 describes a control method of compensating set-point of Load Ratio control Transformer (LRT) and Step Voltage Regulator (SVR) in real time using real-time measurement values at respective spots in a power system.

CITATION LIST

Non Patent Literature

NPL 1: Hideyuki Kobayashi and other four people, *An Adjustment Control for LRT and SVR Parameters using Real-time Measurements*, 2012 Annual Meeting record, I.E.E. Japan (CD-R), No. 6, 164th issue, p. 293-294

SUMMARY OF INVENTION

Technical Problem

NPL 1 describes a control method using measurement values from measuring apparatuses installed at respective spots in a power system. However, the technology of NPL 1 is not able to address configuration changes in measuring apparatuses used by the technology described in NPL 1 and configuration changes of the power system and the like, in response to events occurring in actual operation, such as configuration changes in the power system, and failures and control limit state in a control apparatus, and the like.

The invention has been made in view of the above-mentioned technical background, and an object of the invention is to select a measuring apparatus for use according to a state of a power system.

Solution to Problem

In order to solve the above described problem, the invention includes a measuring apparatus extraction unit that, when a predetermined condition is satisfied, extracts: a measuring apparatus sandwiched between the two control apparatuses when there is the control apparatus at the downstream of the control apparatus to be processed; and, a measuring apparatus connected to the downstream side of the control apparatus to be processed when there is no other control apparatus at the downstream thereof.

The other solutions are explained in embodiments appropriately as needed.

Advantageous Effects of Invention

According to the invention, a measuring apparatus for use is able to be selected according to a state of a power system.

BRIEF DESCRIPTION OF DRAWINGS

FIGS. 26A and 26B are diagrams for explanation of compensation values.

DESCRIPTION OF EMBODIMENTS

Figure 1:
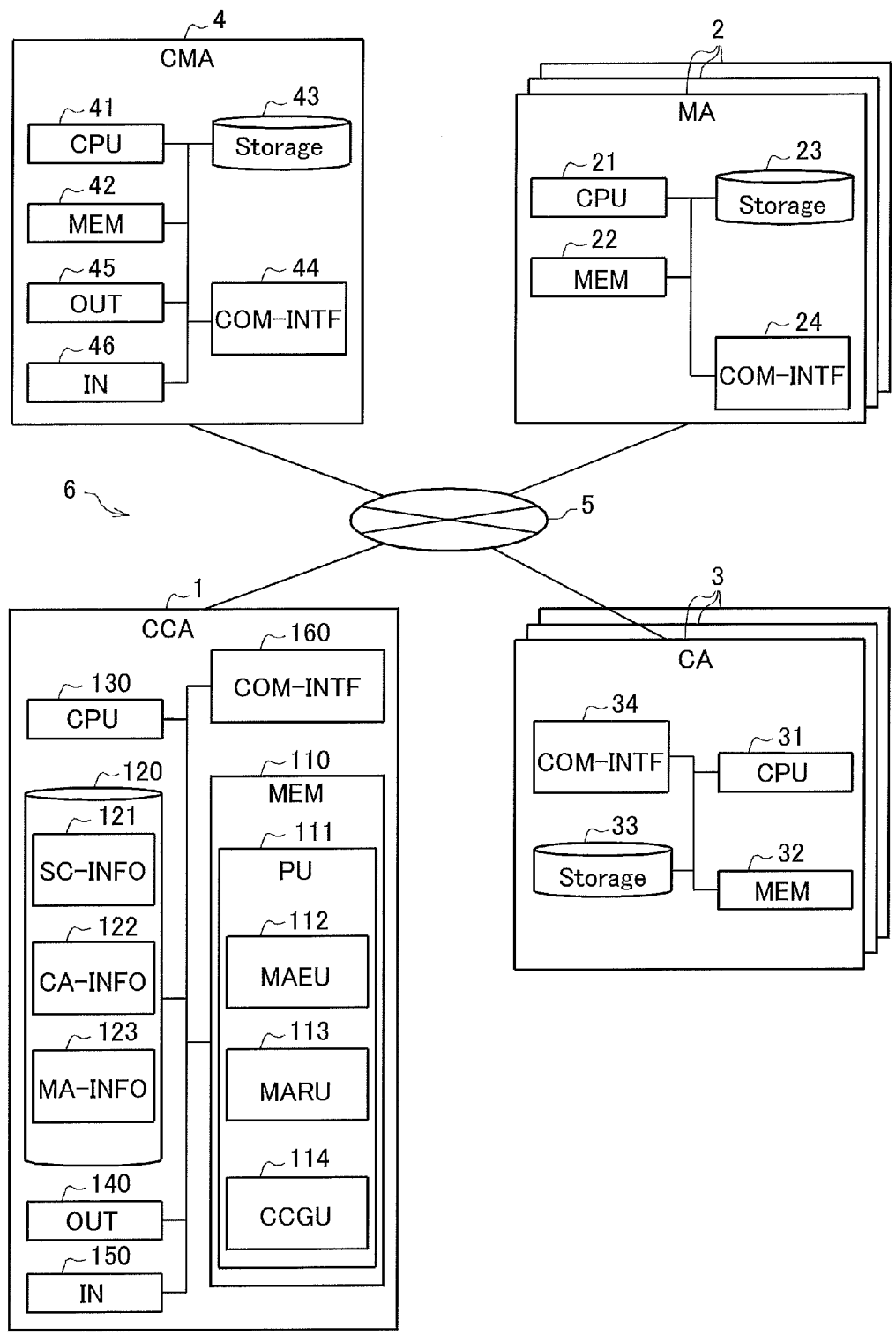
FIG. 1 is a diagram showing a configuration example of a power system control system according to the first embodiment.

Embodiments of the invention are now explained in detail appropriately as needed referring to the drawings. Note that, in the respective drawings, the same signs are assigned to the same elements and their duplicate explanation is omitted. In the drawings, most terms are represented by an acronym or abbreviation and the first appearance of each term is followed by the acronym or abbreviation parenthesized at the beginning of a description of each figure.

First Embodiment

First, the first embodiment of the invention is described with reference to FIGS. 1 to 11.

The first embodiment is adapted to select and acquire a measuring apparatus 2 connected to a control apparatus 3 when sensing a change of a power system.

<System Configuration>

FIG. 1 shows a configuration example of a power system control system according to the first embodiment.

A power system control system 6 includes a control command apparatus (CCA) 1, at least one measuring apparatus (MA) 2, at least one control apparatus (CA) 3, a central management apparatus (CMA) 4, and a communication path 5, each of which is connected to one another via the communication path 5. The communication path 5 employs a standard such as, e.g. a wire or wireless communication standard.

The control command apparatus 1 generates and transmits a control command to the control apparatus 3.

The central management apparatus 4 manages the power system control system 6 and has a function of, for example, notifying the control command apparatus 1 of a change that occurs in the power system including the above apparatuses such as the control apparatus 3, the measuring apparatus 2.

The measuring apparatus 2 is an apparatus, e.g. a switch with sensor, and acquires measurement values including various kinds of electric variables and transmits them to the other apparatuses via the communication path 5.

The control apparatus 3 is, e.g. a transformer with a tap such as an LRT or an SVR, and changes a parameter of its own tap or the like according to a control parameter contained in a control command transmitted from the control command apparatus 1. Further, the control apparatus 3 may perform control operation by calculating a control variable based on the control parameter by itself. Note that if the control apparatus 3 is an SVR or an LRT, the control parameter is a set-point value (reference voltage or the like) of a relay. Furthermore, if the control apparatus 3 is an SVR or LRT, the control variable includes a tap number (transformer ratio), a step-up value of a voltage based on the tap number or the like.

<Control Command Apparatus>

The control command apparatus 1, when receiving information on a change of the power system configuration (a change notification of the system configuration) from the central management apparatus 4, selectively extracts the control apparatus 3 and the measuring apparatus 2 connected to the control apparatus 3. Then, the control command apparatus 1 calculates a control parameter to be output to the control apparatus 3 connected to the measuring apparatus 2 based on the measurement value sent from the measuring apparatus 2.

The control command apparatus 1 has at least a memory (MEM) 110, a storage device 120, a Central Processing Unit (CPU) 130, an output device (OUT) 140, an input device (IN) 150 such as a keyboard and a mouse, and a communication interface (COM-INTF) 160.

Programs related to a processing unit (PU) 111, a measuring apparatus extraction unit (MAEU) 112, a measuring apparatus registration unit (MARU) 113, and a control command generation unit (CCGU) 114 included in the processing unit 111 are loaded from the storage device 120 into the memory 110 and executed by the CPU 130.

The processing unit 111 includes the measuring apparatus extraction unit 112, the measuring apparatus registration unit 113, and the control command generation unit 114, and performs various kinds of information processing.

When receiving the change notification of the power system configuration from the central management apparatus 4, the measuring apparatus extraction unit 112 reflects the change into the system configuration information (SC-INFO) 121. Further, the measuring apparatus extraction unit 112 extracts information on the control apparatus 3 and information on the measuring apparatus 2 connected to the control apparatus 3 based on the system configuration information 121 or the like, and sends an extraction result to the measuring apparatus registration unit 113 as connection information (CON-INFO).

The measuring apparatus registration unit 113 registers the connection information sent from the measuring apparatus extraction unit 112 in measuring apparatus information (MA-INFO) 123.

The control command generation unit 114 generates a control command containing the control parameter for each control apparatus 3 based on the measurement value sent from the measuring apparatus 2 and transmits it to the control apparatus 3.

The storage device 120 is a device, e.g., a hard disk, a flash memory, or the like, to that stores programs and data, and stores the system configuration information 121, control apparatus information (CA-INFO) 122, the measuring apparatus information 123, etc.

The system configuration information 121 is used for management of information on the configuration of the power system. The system configuration information 121 is described below.

The control apparatus information 122 is information used for management of the control apparatus 3 existing on the power system. The control apparatus information 122 is described below.

The measuring apparatus information (MA-INFO) 123 is information on the control apparatus 3 in a power system and the measuring apparatus 2 connected to the power system. The measuring apparatus information 123 is described below.

The communication interface (COM-INTF) 160 is an interface such as a wired Local Area Network (LAN) card or a wireless LAN card, and transmits and receives information to and from the central management apparatus 4, the measuring apparatus 2, the control apparatus 3, and the like via the communication path 5.

The output device (OUT) 140 includes, e.g. a display device, lamp, or the like. The output device 140 displays the control apparatus 3 selected and extracted by the measuring apparatus extraction unit 112 and the measuring apparatus 2 connected to the control apparatus 3. Further, the output device 140 displays the measurement value received from the measuring apparatus 2 and a content of the control command generated by the control command generation unit 114.

The operation of the control command apparatus 1 is described below appropriately as needed.

<Measuring Apparatus>

The measuring apparatus 2 has at least a CPU 21, a memory (MEM) 22, a storage device (Storage) 23, and a communication interface (COM-INTF) 24.

In the memory 22, one or more programs of a measurement unit (not shown) is loaded from the storage device 23 and executed by the CPU 21. The measurement unit opens and closes the switch with sensor based on an opening/closing instruction to the switch with sensor sent from the central management apparatus 4 and transmits open/close information on the switch with sensor to the central management apparatus 4. The measurement unit may also send measurement values of various kinds of electric variables or the like measured by itself to the control command apparatus 1.

The communication interface (COM-INTF) 24 is an interface such as, e.g. a wired or a wireless LAN card, and transmits and receives information to and from the central management apparatus 4, the control apparatus 3, the control command apparatus 1, etc. via the communication path 5.

The storage device 23 is a device that stores programs and data, e.g., a hard disk, flash memory, or the like. Note that the storage device 23 may be formed by a Read Only Memory (ROM) or the like. In this case, the storage device 23 and the memory 22 may be unified.

The operation of the measuring apparatus 2 is described below appropriately as needed.

<Control Apparatus>

The control apparatus 3 has at least a CPU 31, a memory (MEM) 32, a storage device (Storage) 33, and a communication interface (COM-INTF) 34.

A program of a control unit (not shown) is loaded from the storage device 33 into the memory 32 and executed by the CPU 31. The control unit performs control of, e.g. changing its own tap according to a control parameter contained in a control command received from the control command apparatus 1.

The communication interface 34 is an interface such as a wired or a wireless LAN card, and transmits and receives information to and from the central management apparatus 4, the measuring apparatus 2, and the control command apparatus 1 via the communication path 5.

The storage device 33 is a device, e.g. a hard disk, a flash memory, which stores one or more programs of the control unit and data used in the control unit. Note that the storage device 33 may be configured by a ROM or the like. In this case, the storage device 33 and the memory 32 may be unified.

The operation of the control apparatus 3 is described below appropriately as needed.

<Central Management Apparatus>

The central management apparatus 4 has at least a CPU 41, a memory (MEM) 42, a storage device 43, a communication interface (COM INTF) 44, an output device (OUT) 45, and an input device (IN) 46.

One or more programs of a central management unit (not shown) is loaded from the storage device 43 into the memory 42, and executed by the CPU 41. The central management unit sends the opening/closing instruction of the switch with sensor inputted via the input device 46 to the measuring apparatus 2, and receives open/close information of the switch with sensor in the measuring apparatus 2 and transmits the information to the control command apparatus 1.

The output device 45 includes, e.g. a display device, lamp, or the like. The output device 45 displays an execution result of the program operated in the central management apparatus 4 and contents outputted from by the respective apparatuses such as the control command apparatus 1, the control apparatus 3, and the measuring apparatus 2, acquired via the communication path 5.

Further, the central management unit may make the output device 45 display the control command sent from the control command apparatus 1. Thereby, an administrator may confirm the control command outputted by the control command apparatus 1 in response to the command of the central management apparatus 4 by checking the output device 45.

The communication interface 44 is, e.g. an interface such as a wired or a wireless LAN card, and transmits and receives information to and from the measuring apparatus 2, the control apparatus 3, the control command apparatus 1, etc. via the communication path 5.

The storage device 43 is a device, e.g. a hard disk, flash memory, or the like, which stores one or more programs of the central management unit and data used in the central management unit.

The operation of the central management apparatus 4 is described below appropriately as needed.

<System Configuration Information>

Figure 2:
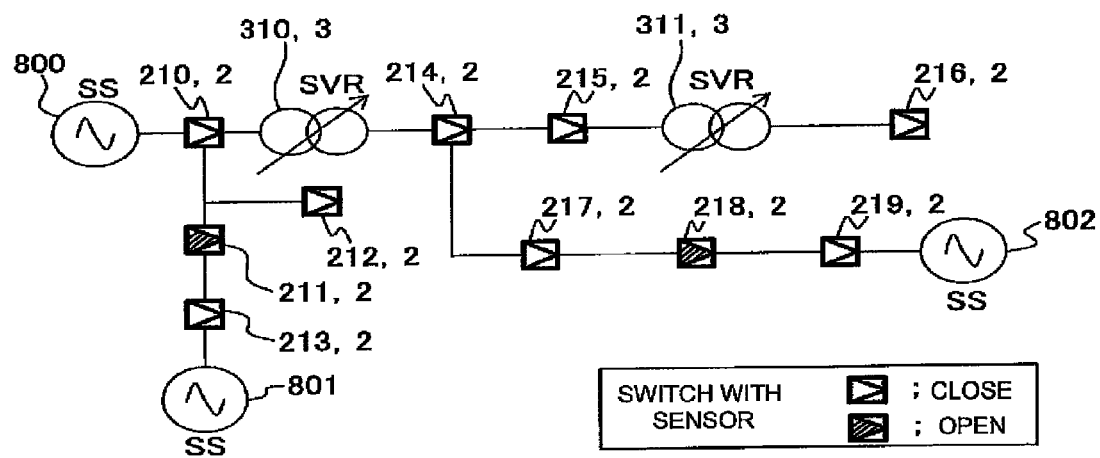
FIG. 2 is a diagram showing a configuration example of a power system according to the first embodiment (Part 1).
Figure 3:
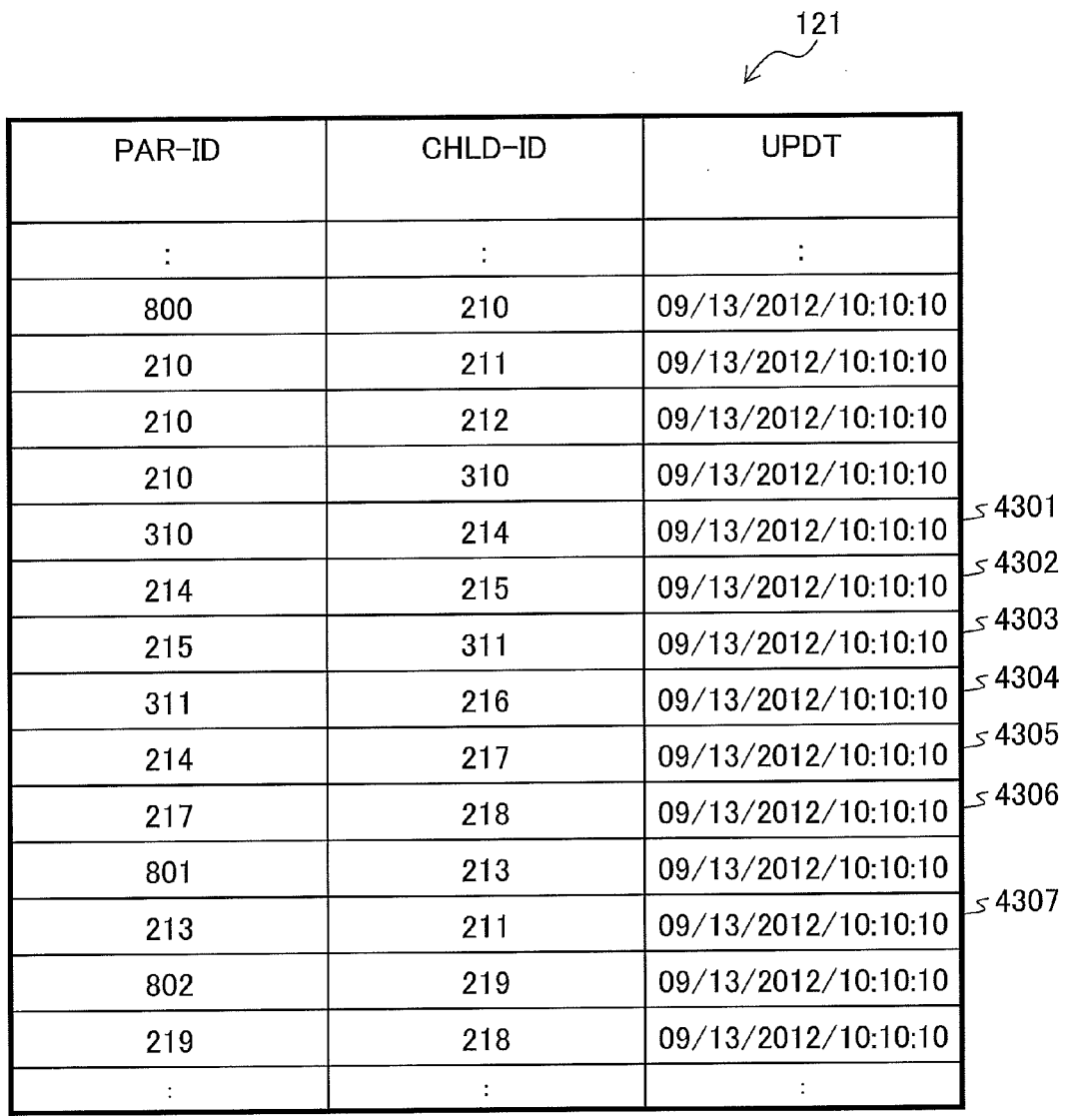
FIG. 3 is a diagram showing an example of system configuration information according to the first embodiment (Part 1).
Figure 4:
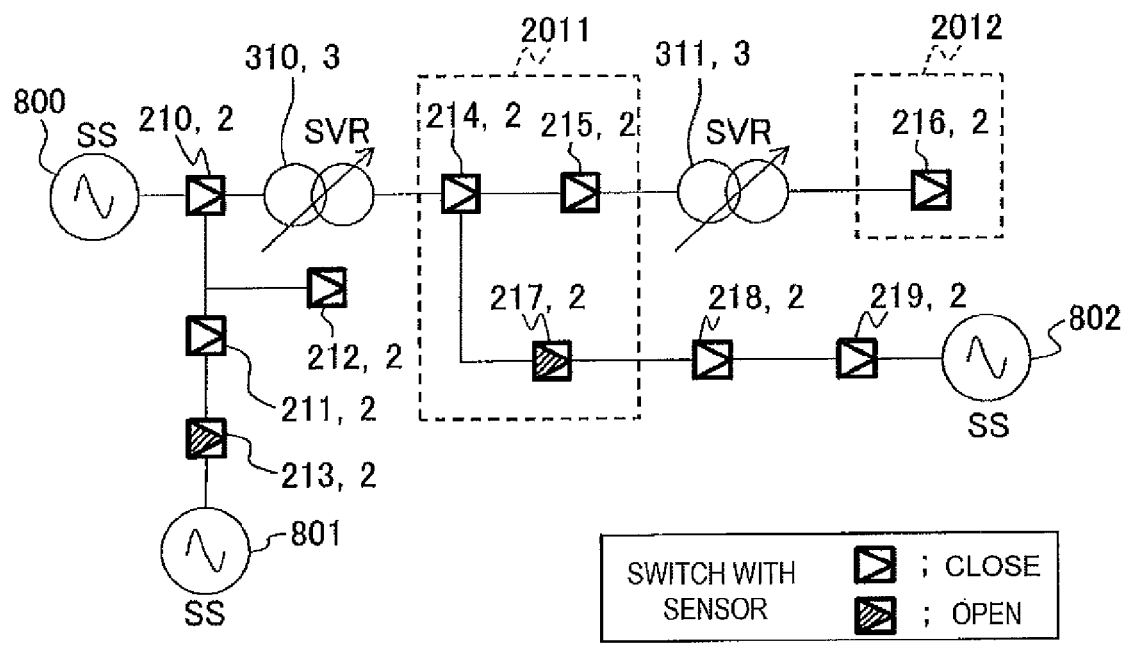
FIG. 4 is a diagram showing a configuration example of the power system according to the first embodiment (Part 2).

Next, examples of the configurations of the power system and system configuration information for the configurations are shown with reference to FIGS. 2 to 4.

FIG. 2 shows a configuration example of the power system according to the first embodiment.

SVRs 310 and 311 in FIG. 2 correspond to the control apparatuses 3 in FIG. 1, and switches with sensor 210 to 219 correspond to the measuring apparatuses 2 in FIG. 1. Note that substations (SSs) are facilities not belonging to the measuring apparatus 2 or control apparatus 3, and that signs of the switches with sensor and the SVRs in the configuration diagram of the power systems in FIGS. 2, 4, etc. are Identifications (IDs) of the switches with sensor and the SVRs.

FIG. 3 shows an example of the system configuration information which reflects the configuration of the power system in FIG. 2.

As shown in FIG. 3, the system configuration information (SC-INFO) 121 has at least each field of a parent apparatus ID (PA-ID), a child apparatus ID (CA-ID), and an update date and time (UPDT). The update date and time is a date and time when receiving a notification of a configuration change of the power system (configuration change information) from the central management apparatus 4.

Here, parent-child relationship are defined such that an apparatus closer to a substation (SS) or a power station is a "parent" and an apparatus farther from the substation (SS) or the power station is a "child". Alternatively, a side closer to a substation or a power station may be referred to as "upstream" and a side farther from the substation or the power station and closer to a power receiving facility may be referred to as "downstream".

Note that the open states of the switches with sensor 210 to 219 in FIG. 2 show the ends of the system.

For example, in the example configuration of FIG. 2, the power systems starting with the SS 800 include the following four power systems, in order from the upstream side: the power system of SS 800→switch with sensor 210→SVR 310→switch with sensor 214→ switch with sensor 215→ SVR 311→ switch with sensor 216; the power system of SS 800→switch with sensor 210→switch with sensor 212, the power system of SS 800→switch with sensor 210→ switch with sensor 211; and the power system of SS 800→switch with sensor 210→ SVR 310→switch with sensor 214→ switch with sensor 217→ switch with sensor 218.

Further, the power system starting with the SS 801 is only one power system of SS 801→ switch with sensor 213→ switch with sensor 211 because of the open state of the switch with sensor 211. Similarly, the power system starting with the SS 802 is only one power system of SS 802→switch with sensor 219→switch with sensor 218 because of the open state of the switch with sensor 218.

In the system configuration information 121 shown in FIG. 3, the configuration of the power system shown in FIG. 3 is stored in a form in association of the parent apparatuses with the child apparatuses. Note that, as shown by the switch with sensor 214 in FIG. 2, the branching power system is registered as a plurality of parent apparatus IDs such as records 4302 and 4305 in FIG. 3.

Here, the configuration is assumed to have changed from the power systems shown in FIG. 2 to the power systems shown in FIG. 4.

In FIG. 4, the switch with sensor 217 has changed from close to open, the switch with sensor 218 has changed from open to close, and further, the switch with sensor 211 has changed from open to close and the switch with sensor 213 has changed from close to open.

Thereby, the power systems starting with the SS 800 additionally include the power system of SS 800→switch with sensor 210→ switch with sensor 211→ switch with sensor 213. Similarly, as the power system starting with the SS 800 changes from SS 800→ switch with sensor 210→ SVR 310→switch with sensor 214→ switch with sensor 217→ switch with sensor 218 in FIG. 2 to . . . switch with sensor 214→ switch with sensor 217. Further, the power system starting with SS 801 is changed to the power system of SS 801→ switch with sensor 213, and the power system starting with SS 802 is changed to the power system of SS 802→ switch with sensor 219→ switch with sensor 218→ switch with sensor 217.

The parts indicated by signs 2011 and 2012 in FIG. 4 are described below.

Figure 5:
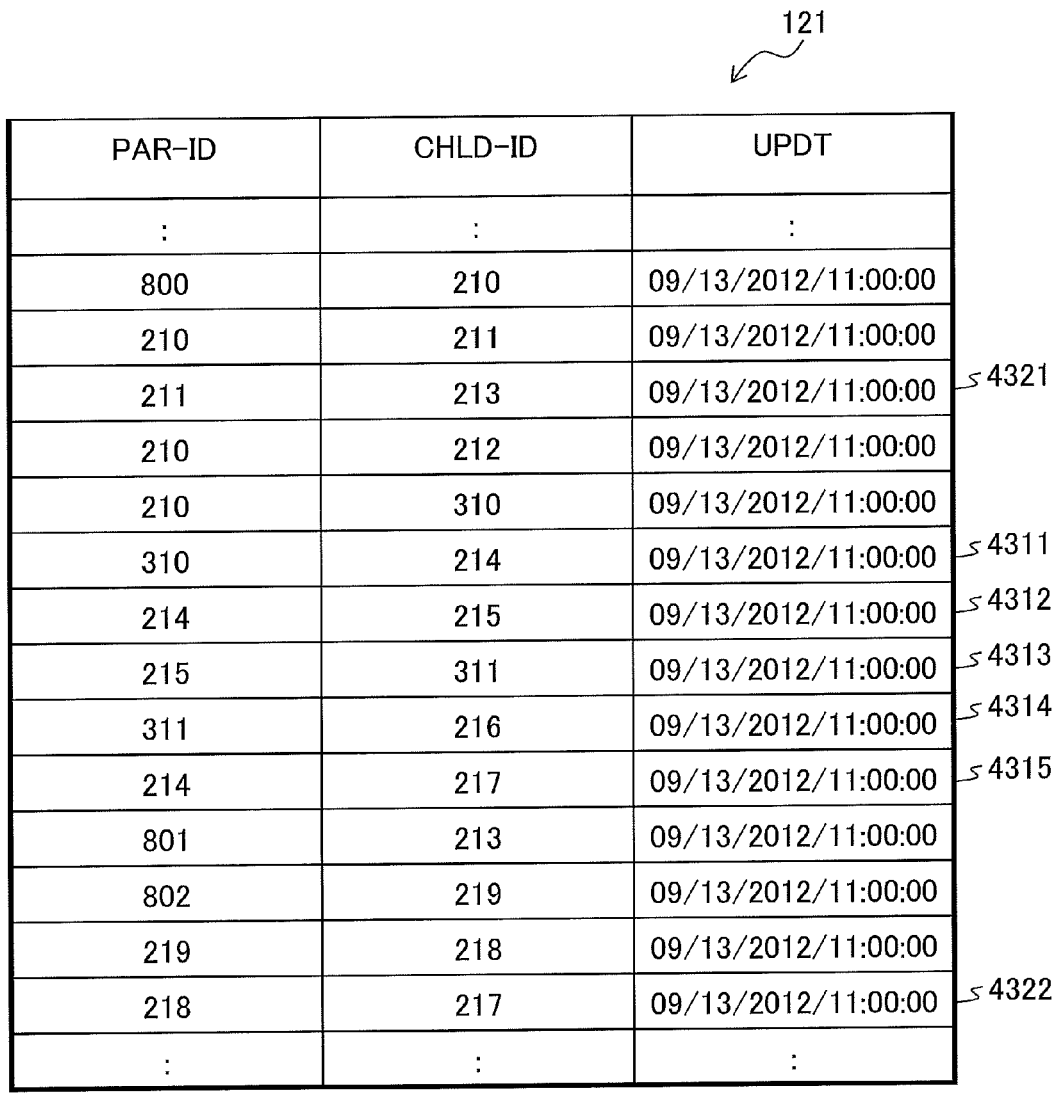
FIG. 5 is a diagram showing an example of the system configuration information according to the first embodiment (Part 2).

FIG. 5 shows an example of the system configuration information which reflects the changed power system shown in FIG. 4.

In the system configuration information (SC-INFO) 121 of FIG. 5, the configuration of the changed power systems shown in FIG. 4 is reflected, and the records corresponding to the records 4306 and 4307 in FIG. 3 are eliminated and records 4321 and 4322 in FIG. 5 are added.

Note that, in this embodiment, the system configuration information 121 in FIG. 5 is added to the system configuration information 121 in FIG. 3. However, the system configuration information 121 in FIG. 3 may be overwritten with the system configuration information 121 in FIG. 5. In this case, the update date and time may be omitted.

<Control Apparatus Information>

Figure 6:
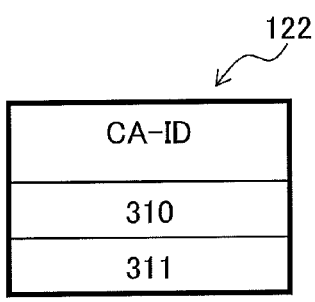
FIG. 6 is a diagram showing an example of control apparatus information according to the first embodiment.

FIG. 6 shows an example of control apparatus information according to the first embodiment.

As shown in FIG. 6, the control apparatus information 122 has at least a field of a control apparatus ID (CA-ID), which is stored in a list form. The control apparatus information 122 is generated based on information inputted to the control command apparatus 1 via the input device (IN) 150 or the like.

Note that the list of the control apparatus IDs in the control apparatus information 122 is information inputted by a user via the input device 150 in advance.

<Measuring Apparatus Information>

Figure 7:
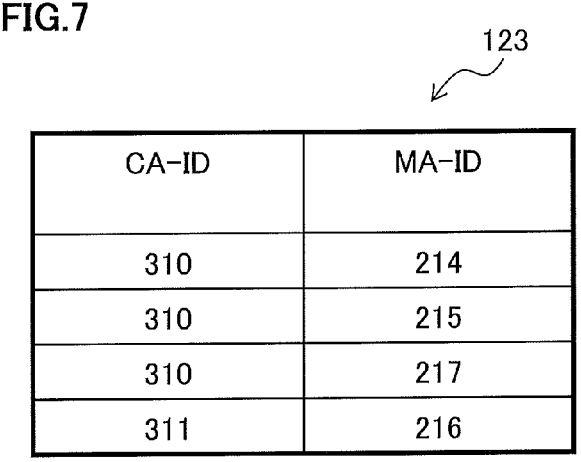
FIG. 7 is a diagram showing an example of measuring apparatus information according to the first embodiment.

FIG. 7 shows an example of measuring apparatus information according to the first embodiment.

The measuring apparatus information (MA-INFO) 123 contains information of the control apparatus 3 selected and extracted by the measuring apparatus extraction unit 112 and the measuring apparatus 2 connected to the downstream side (child apparatus side) of the control apparatus 3.

As shown in FIG. 7, a record of the measuring apparatus information 123 has at least fields of a control apparatus ID (CA-ID) and a measuring apparatus ID (MA-ID).

Here, the respective IDs of the switches with sensor (measuring apparatuses 2) 214, 215, and 217 connected to the downstream side of the SVR (control apparatus 3) 310 and the switch with sensor 216 connected to the downstream side of the SVR 311 in FIG. 4.

As described above, the control apparatus ID is associated with the measurement apparatus ID of the measuring apparatus 2 connected at the downstream side of the control apparatus 3 corresponding to the control apparatus ID, which makes it easier to identify the measuring apparatus 2 used for calculation of the control parameter of the control apparatus 3 by the control command generation unit 114, which is described below.

Figure 8:
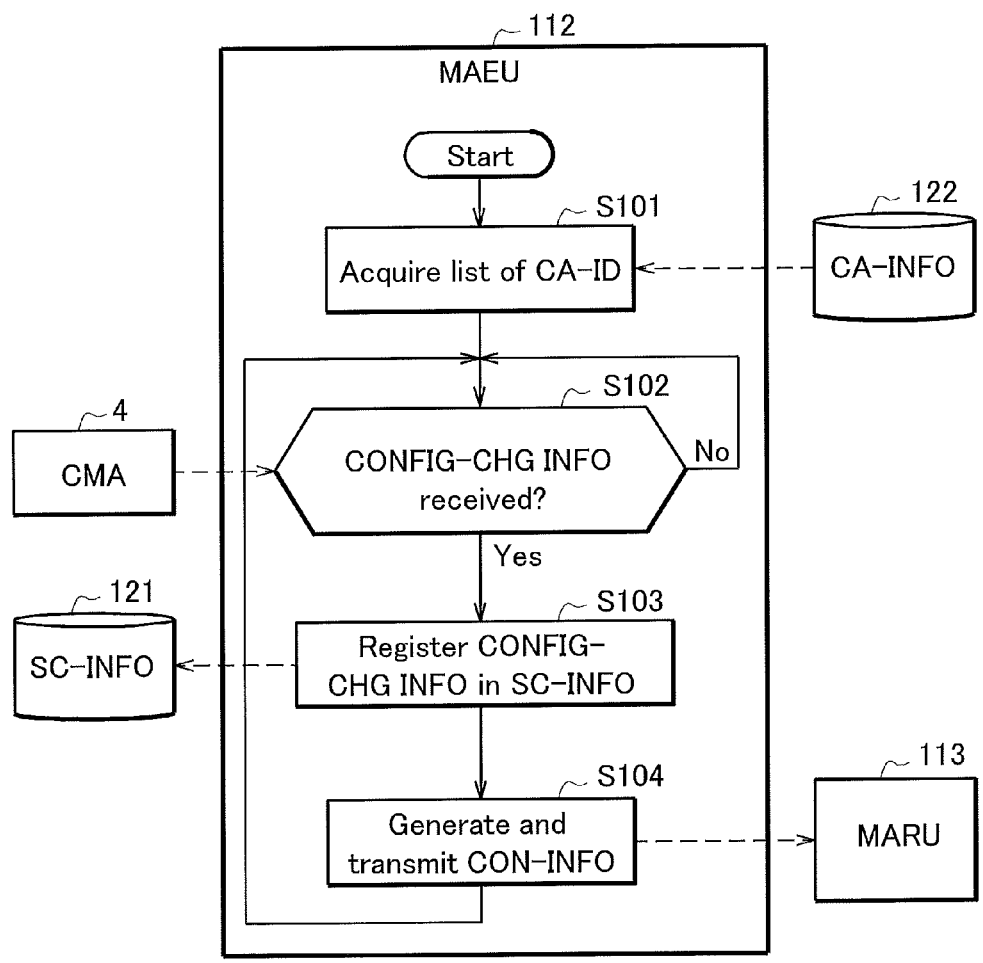
FIG. 8 is a flowchart showing a procedure of measuring apparatus extraction according to the first embodiment.
Figure 15:
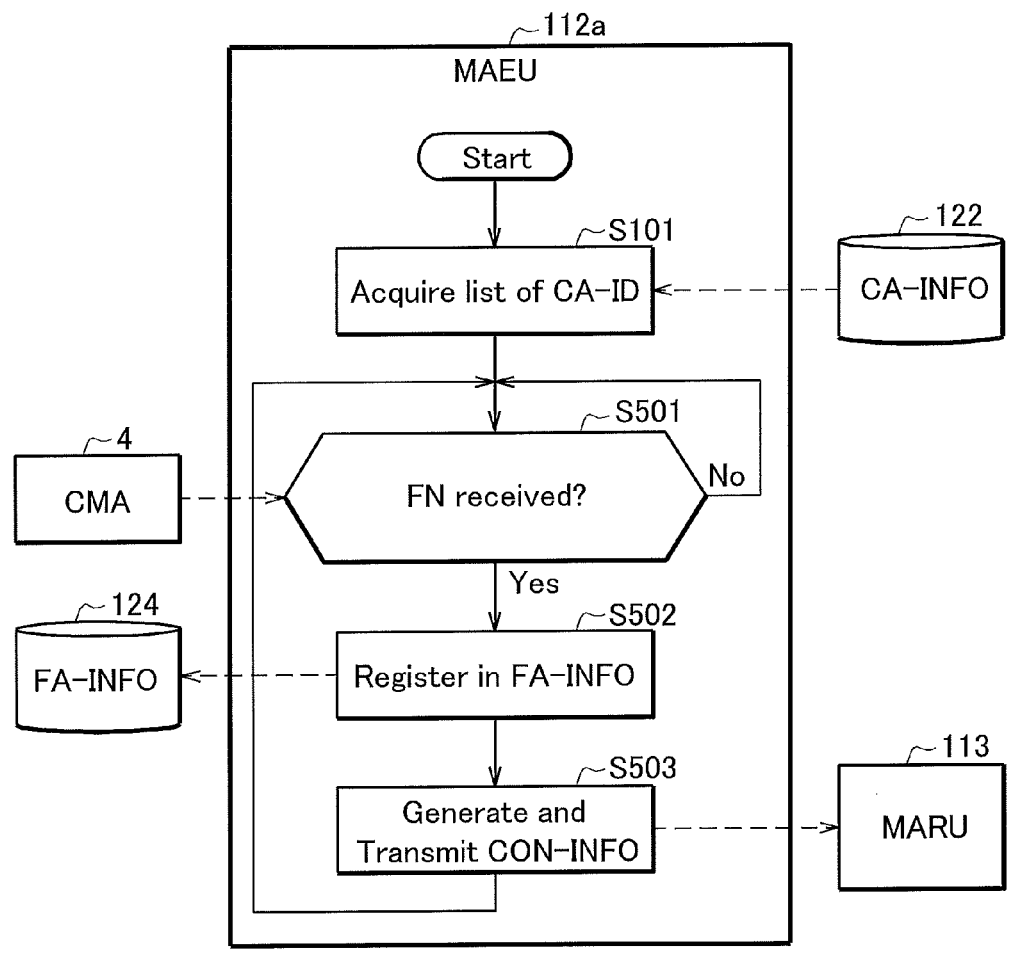
FIG. 15 is a flowchart showing a procedure of measuring apparatus extraction according to the second embodiment.
Figure 22:
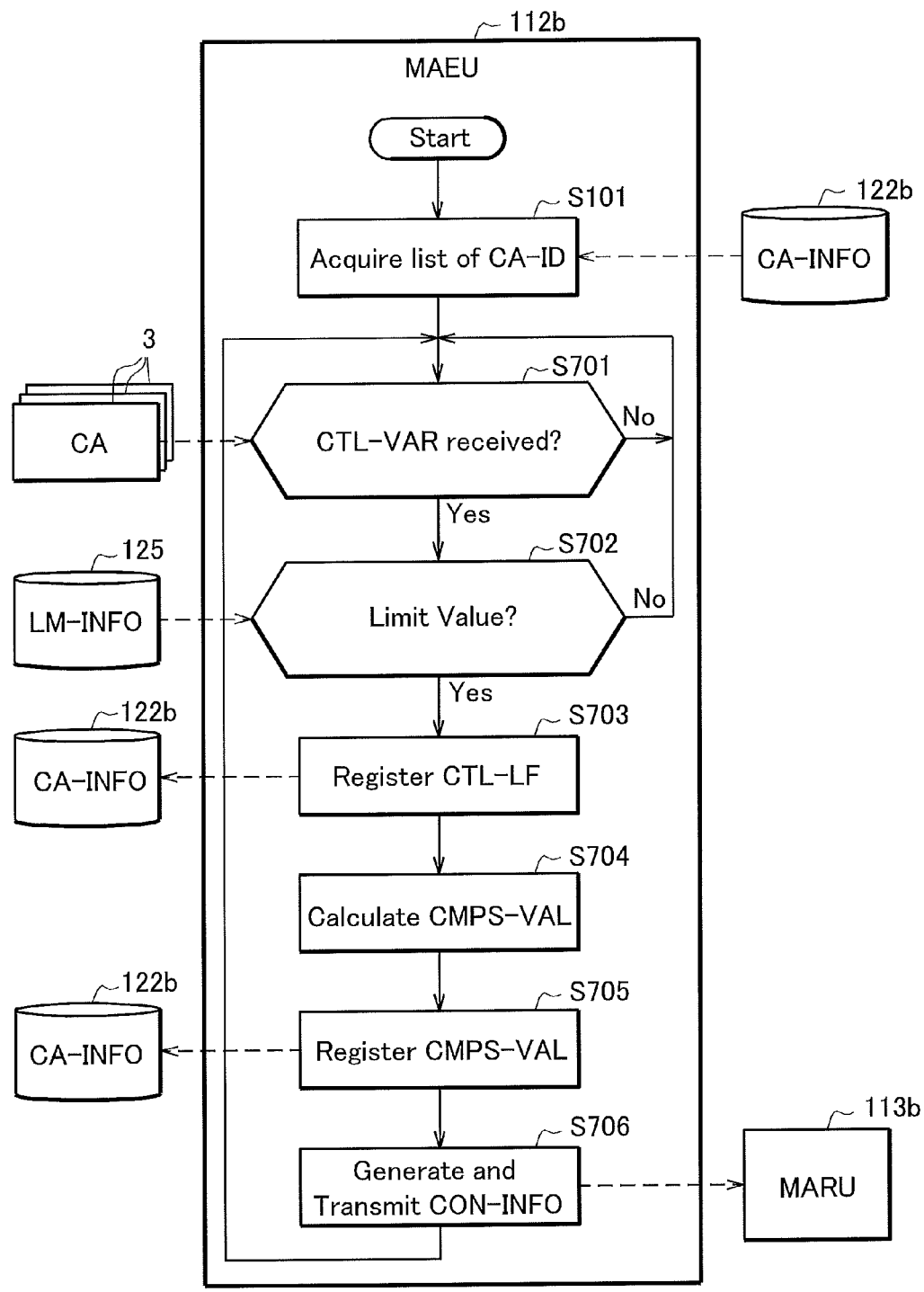
FIG. 22 is a flowchart showing a procedure of measuring apparatus extraction according to the third embodiment.

Note that the measuring apparatus information 123 is generated when generation and transmission of connection information, which is described below in FIGS. 8, 15, and 22, is performed. However, information manually inputted by a user via the input device 150 may be used as initial information of the system configuration information 121.

<Measuring Apparatus Extraction Processing>

FIG. 8 is a flowchart showing a procedure of measuring apparatus extraction according to the first embodiment.

According to the flowchart, the measuring apparatus extraction unit (MAEU) 112 receives a change of the power system configuration from the central management apparatus (CMA) 4 and reflects the change in the system configuration information (SC-INFO) 121. Further, the measuring apparatus extraction unit 112 extracts the measuring apparatus (MA) 2 having measurement values used for adjustment of the control parameter of each control apparatus 3, and transmits a number for unique identification of the measuring apparatus 2 to the control command generation unit 114.

The activated measuring apparatus extraction unit 112 acquires a list of control apparatus IDs (CA-IDs) contained in the control apparatus information (CA-INFO) 122 (S101).

Then, the measuring apparatus extraction unit 112 determines whether or not to have received configuration change information (CONFIG-CHG INFO) from the central management apparatus 4 (i.e., whether or not to have sensed a change of connection relationship in the power system) (S102). That is, the measuring apparatus extraction unit 112 determines whether or not to have sensed a configuration change of the power system. The configuration change information (CONFIG-CHG-INFO) contains information on an apparatus in which the configuration has been changed. The change of the configuration refers to, e.g. open/close of the switch with sensor in the measuring apparatus 2.

Here, the central apparatus 4 has information on an overall configuration of the substations, the control apparatuses 3, and the measuring apparatuses 2 in the power system in the storage device 43. And, if open/close of the switches with sensor 210 to 219 (FIG. 2) as the measuring apparatuses 2 are sensed, the central management unit (not shown) in the central apparatus 4 refers to the information on the configuration of the overall power system to generate pairing information of the parent apparatus IDs of the parent apparatuses and the child apparatus IDs of the child apparatuses connected to the parent apparatuses with respect to the apparatuses in the overall power system (transformer apparatuses in the substations, the measuring apparatuses 2, the control apparatuses 3), and transmits it to the control command apparatus 1.

If the result of step S102 indicates "having not received the configuration change information (CONFIG-CHG-INFO)" (S102→No), the measuring apparatus extraction unit 112 returns the processing to step S102 and waits for reception of the configuration change information.

If the result of step S102 indicates "having received the configuration change information (CONFIG-CHG-INFO)" (S102→Yes), the measuring apparatus extraction unit 112 registers the configuration change information with the update date and time in the system configuration information (SC-INFO) 121 (S103). Note that, at step S103, the measuring apparatus extraction unit 112 may register the configuration change information additionally or by overwriting in the system configuration information 121. Note that, when registration by overwriting is performed at step S103, the update date and time may be omitted in the system configuration information 121 in FIG. 3.

Then, the measuring apparatus extraction unit 112 extracts information on the control apparatus 3 and the measuring apparatus 2 connected to the control apparatus 3 from the system configuration information 121, generates the connection information (CON-INFO) from the extraction result, transmits it to the measuring apparatus registration unit (MARU) 113 (S104), and returns the processing to step S102. The processing at step S104 is described as follows with reference to FIG. 9.

<Connection Information Generation and Transmission>

Figure 9:
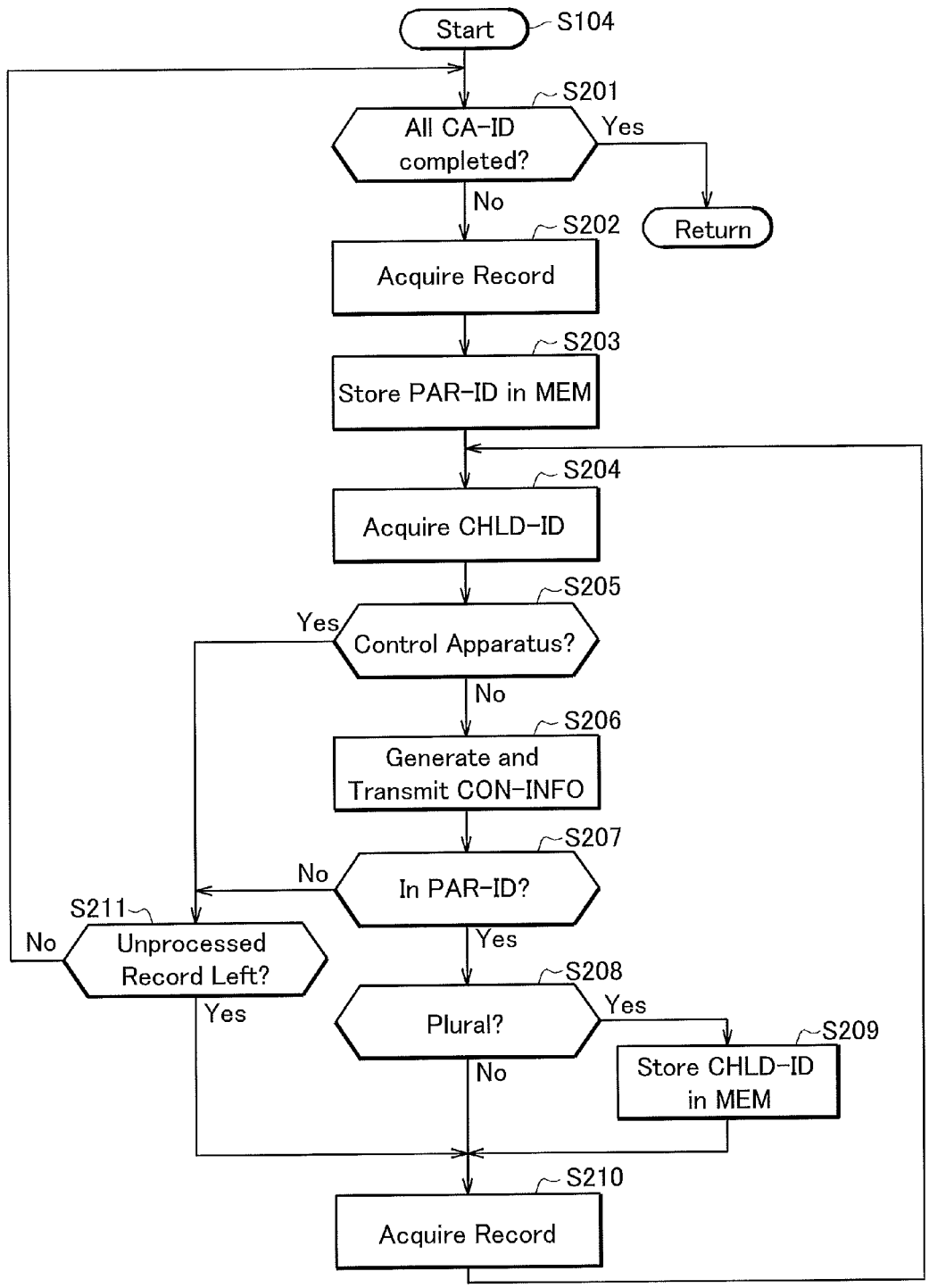
FIG. 9 is a flowchart showing a detailed procedure of connection information generation and transmission according to the first embodiment.

FIG. 9 is a flowchart showing a detailed procedure of connection information generation and transmission (S104) in FIG. 8.

First, the measuring apparatus extraction unit 112 of the control command apparatus 1 determines whether or not processing at the following steps S201 to S210 has been completed with respect to all control apparatus IDs (CA-IDs) in the list of the control apparatus IDs acquired at step S101 in FIG. 8 (S201).

If the result of step S201 is that the processing has been completed with respect to all control apparatus IDs (S201→Yes), the measuring apparatus extraction unit 112 returns to the processing in FIG. 8.

If the result of step S201 is that the processing has not been completed with respect to all control apparatus IDs (CA-IDs) (S201→No), the measuring apparatus extraction unit 112 acquires a record from the system configuration information 121, which record has the latest date and time and has a control apparatus ID in the cell of the parent apparatus ID (PA-ID) for which the processing at the steps S201 to S210 has not been performed (S202), and stores in memory 110 the parent apparatus ID in the acquired record (S203). Note that, if the system configuration information has been overwrite-registered at step S103, the measuring apparatus extraction unit acquires the record having the control apparatus ID in the cell of the parent apparatus ID for which the processing at the steps S201 to S210 has not been performed from the system configuration information 121, regardless of the update date and time.

Then, the measuring apparatus extraction unit 112 acquires a child apparatus ID (CHLD-ID) in the record acquired at step S202 (S204).

Subsequently, the measuring apparatus extraction unit 112 refers to the control apparatus information 122 to determine whether or not the child apparatus ID acquired at step S204 is contained in the control apparatus information 122, and thereby, determines whether or not the acquired child apparatus ID is an ID of the control apparatus 3 (S205).

If the result of step S205 indicates that the acquired child apparatus is the control apparatus (CA) 3 (S205→Yes), the measuring apparatus extraction unit 112 moves the processing to step S211.

If the result of step S205 indicates that the acquired child apparatus is not the control apparatus 3 (S205→No), i.e., that the acquired child apparatus is the measuring apparatus 2, the measuring apparatus extraction unit 112 generates connection information (CON-INFO) of the parent apparatus ID (control apparatus ID) stored in memory 110 at step S203 and the child apparatus ID (measuring apparatus ID) acquired at step S204 as pairing information, and transmits it to the measuring apparatus registration unit 113 (S206).

Subsequently, the measuring apparatus extraction unit 112 determines whether or not the child apparatus ID acquired at step S204 is in the cell of the parent apparatus ID (PAR-ID) of the system configuration information 121 (S207).

If the result of step S207 indicates that the acquired child apparatus ID is in the cell of the parent apparatus ID (S207→Yes), the measuring apparatus extraction unit 112 determines whether or not the same child apparatus ID exists in the plurality of cells of the parent apparatus ID (S208).

If the result of step S208 indicates that the same child apparatus ID does not exist in the plurality of cells of the parent apparatus IDs (S208→No), the measuring apparatus extraction unit 112 moves the processing to step S210.

If the result of step S208 indicates that the same child apparatus ID exists in the plurality of cells of the parent apparatus IDs (S208→Yes), the measuring apparatus extraction unit 112 stores the child apparatus ID (CHLD-ID) being currently processed in, e.g. the memory (MEM) 110 (S209).

Then, the measuring apparatus extraction unit 112 acquires a record having in the cell of the parent apparatus ID the child apparatus ID in the currently-processed record from the system configuration information (SC-INFO) 121 (S210), and returns the processing to step S204.

On the other hand, if the child apparatus is found to be the control apparatus 3 at step S205 (S205→Yes) or, if the result of step S207 indicates that the child apparatus ID being currently processed is not in the cell of the parent apparatus ID of the system configuration information 121 (S207→No), the measuring apparatus extraction unit 112 determines whether or not there is an unprocessed record among the records having the child apparatus ID stored in memory 110 at step S209 in the cell of the parent apparatus ID of the system configuration information 121 (S211).

If the result of step S211 indicates that there is no unprocessed record (S211→No), the measuring apparatus extraction unit 112 returns the processing to step S201. Concurrently, the measuring apparatus extraction unit 112 deletes the parent apparatus ID stored in memory 110 at step S203 and the child apparatus ID stored in memory 110 at step S209.

If the result of step S211 is that there is an unprocessed record (S211→Yes), the measuring apparatus extraction unit 112 moves the processing to step S210, and acquires the unprocessed record from the system configuration information 121.

Now, the operation when the processing shown in FIG. 9 is performed is explained based on the system configuration information 121 shown in FIG. 5.

Here, selection and extraction of the measuring apparatus 2 connected to the downstream side of the control apparatus 3 of the SVR 310 (See FIG. 4) is explained. Note that the step numbers in the explanation corresponds to the step numbers in the processing in FIG. 9.

First, at step S202, the measuring apparatus extraction unit 112 acquires a record 4311 with the parent apparatus ID "310" (FIG. 5, hereinafter, the signs in the records indicate the signs in FIG. 5) from the system configuration information 121 based on the list of the control apparatus IDs acquired at step S101. Then, at step S203, the measuring apparatus extraction unit 112 stores in memory 110 the parent apparatus ID "310" acquired from the record.

Then, the measuring apparatus extraction unit 112 acquires the child apparatus ID at step S204 from the record acquired at step S202. The child apparatus ID of the record 4311 is "214". Then, at step S205, the measuring apparatus extraction unit 112 determines whether or not the acquired child apparatus ID is in the control apparatus IDs contained in the control apparatus information 122 in FIG. 6, and thereby, determines whether or not the acquired child apparatus ID is a control apparatus 3. Here, the acquired child apparatus ID "214" is not contained in the control apparatus information 122, and thus, the measuring apparatus extraction unit 112 determines "No" at step S205 and sends connection information (CON-INFO) (310, 214) as pairing information of the parent apparatus ID stored in memory 110 at step S203 (i.e., control apparatus ID) "310" and the child apparatus ID "214" to the measuring apparatus registration unit 113 (S206).

Subsequently, at step S207, the measuring apparatus extraction unit 112 determines whether or not the acquired child apparatus ID exists in the cell of the other parent apparatus IDs.

The child apparatus ID "214" exists in the records 4312, 4315, and the measuring apparatus extraction unit 112 determines "Yes" at step S207.

Subsequently, at step S208, the measuring apparatus extraction unit 112 determines whether or not there exists a plurality of records having the acquired child apparatus ID as the parent apparatus IDs.

The two records 4312, 4315 having ID "214" exist, and thus, the measuring apparatus extraction unit 112 determines "Yes" at step S208, and stores in memory 110 the child apparatus ID "214" at step S209.

Then, at step S210, the measuring apparatus extraction unit 112 acquires the record 4312 as one of the records having the child apparatus ID "214" as the parent apparatus ID from the system configuration information 121.

Returning to step S204, the measuring apparatus extraction unit 112 acquires the child apparatus ID "215" in the record 4312.

Then, the ID "215" is not contained in the control apparatus information 122, and thus, the measuring apparatus extraction unit 112 determines "No" at step S205.

Then, at step S206, the measuring apparatus extraction unit 112 sends connection information (310, 215) as pairing information of the parent apparatus ID stored at step S203 (i.e., control apparatus ID) "310" and the child apparatus ID "215" to the measuring apparatus registration unit 113.

Subsequently, the ID "215" exists in the parent apparatus ID, and the measuring apparatus extraction unit 112 determines "Yes" at step S207.

Further, the record having the ID "215" as the parent apparatus ID is only the record 4313, and thus, "No" is determined at step S208 and the record 4313 having the ID "215" as the parent apparatus ID is acquired by the measuring apparatus extraction unit 112 at step S210.

Returning to step S204, the measuring apparatus extraction unit 112 acquires the child apparatus ID "311" in the record 4313.

The ID "311" is contained in the control apparatus information 122, and the measuring apparatus extraction unit 112 determines "Yes" at step S205.

Then, at step S211, the measuring apparatus extraction unit 112 determines whether or not there is an unprocessed record among the records having the child apparatus ID stored in memory 110 at step S209 in the parent apparatus ID.

Here, the record 4315 having the ID "214" in the parent apparatus ID is unprocessed, and thus, the measuring apparatus extraction unit 112 determines "Yes" at step S211 and acquires the record 4315 from the system configuration information 121 at step S210.

Returning to step S204, the measuring apparatus extraction unit 112 acquires the child apparatus ID "217" in the record 4315.

Then, the ID "217" is not contained in the control apparatus information 122, and thus, the measuring apparatus extraction unit 112 determines "No" at step S205.

Then, at step S206, the measuring apparatus extraction unit 112 sends connection information (310, 217) as pairing information of the parent apparatus ID stored at step S203 (i.e., control apparatus ID) "310" and the child apparatus ID "217" to the measuring apparatus registration unit 113.

Subsequently, the record having the ID "217" in the parent apparatus ID does not exist in the system configuration information 121, and thus, the measuring apparatus extraction unit 112 determines "No" at step S207 and moves the processing to step S211.

There is no more unprocessed record having the child apparatus ID "214" stored in memory 110 at step S209 in the parent apparatus ID, and thus, the measuring apparatus extraction unit 112 deletes the parent apparatus ID "310" stored in memory 110 at step S203 and the child apparatus ID "214" stored in memory 110 at step S209. Then, the measuring apparatus extraction unit 112 performs step S202 after step S201, for example, acquires the record 4314 having the ID "311" in the parent apparatus ID from the system configuration information 121, then, the same processing is subsequently performed, and thereby, connection information (311, 216) is generated and transmitted.

In the above described manner, the connection information, for example, (310, 214), (310, 215), (310, 217), (311, 216) is generated and sent to the measuring apparatus registration unit 113. The measuring apparatus registration unit 113 registers the above information in the measuring apparatus information (MA-INFO) 123, and thereby, the measuring apparatus information 123 as shown in FIG. 7 is generated. Note that the range of the power system shown by the connection information (310, 214), (310, 215), (310, 217) is a range surrounded by a broken line 2011 in FIG. 4.

Similarly, the range of the power system shown by the connection information (311, 216) is a range surrounded by a broken line 2012 in FIG. 4.

That is, the processing in FIG. 9 makes the measuring apparatus extraction unit 112 extract the measuring apparatus 2 existing between the first control apparatus 3 (here, SVR 310) and the second control apparatus 3 (here, SVR 311) located at the downstream of the first control apparatus 3. Alternatively, if there is none of the second control apparatus 3, the measuring apparatus extraction unit 112 extracts the measuring apparatus 2 existing at the downstream of the first control apparatus 3 based on the system configuration information 121.

<Measuring Apparatus Information Registration>

Figure 10:
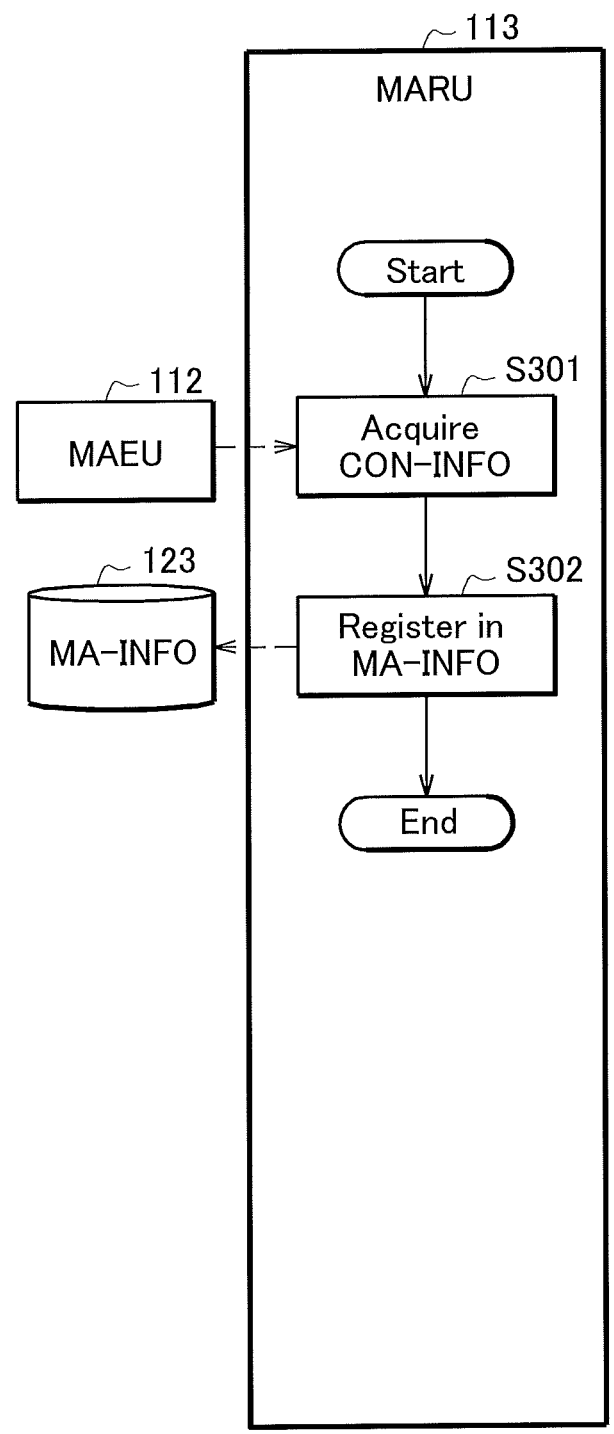
FIG. 10 is a flowchart showing a procedure of measuring apparatus information registration according to the first embodiment.

FIG. 10 is a flowchart showing a procedure of measuring apparatus information registration according to the first embodiment.

According to the flowchart, the measuring apparatus registration unit (MARU) 113 registers the connection information (CON-INFO) transmitted from the measuring apparatus extraction unit (MAEU) 112 in the measuring apparatus information (MA-INFO) 123.

The measuring apparatus registration unit 113 acquires the connection information transmitted by the measuring apparatus extraction unit 112 at step S104 in FIG. 8 (S301).

The measuring apparatus registration unit 113 sequentially registers the acquired connection information in the measuring apparatus information (MA-INFO) 123 (S302). In this regard, the measuring apparatus registration unit 113 once deletes the data contained in the measuring apparatus information 123, and then, stores the connection information newly acquired at step S301 in the measuring apparatus information 123.

For example, at step S301, when data of (310, 214), (310, 215), (310, 217), and (311, 216) as the combinations of (control apparatus ID, measuring apparatus ID) is received, the measuring apparatus information 123 is registered as shown in FIG. 7.

Note that, in this embodiment, the measuring apparatus extraction unit 112 extracts the measuring apparatus 2 connected to the control apparatus 3 and sends connection information on these apparatus 2 and 3 to the measuring apparatus registration unit 113 and the measuring apparatus registration unit 113 stores the sent connection information in the measuring apparatus information 123. However, the present invention is not limited to this embodiment. For example, the measuring apparatus extraction unit 112 may directly register the extracted measuring apparatus ID and the control apparatus ID in the measuring apparatus information 123.

<Control Command Generation>

Figure 11:
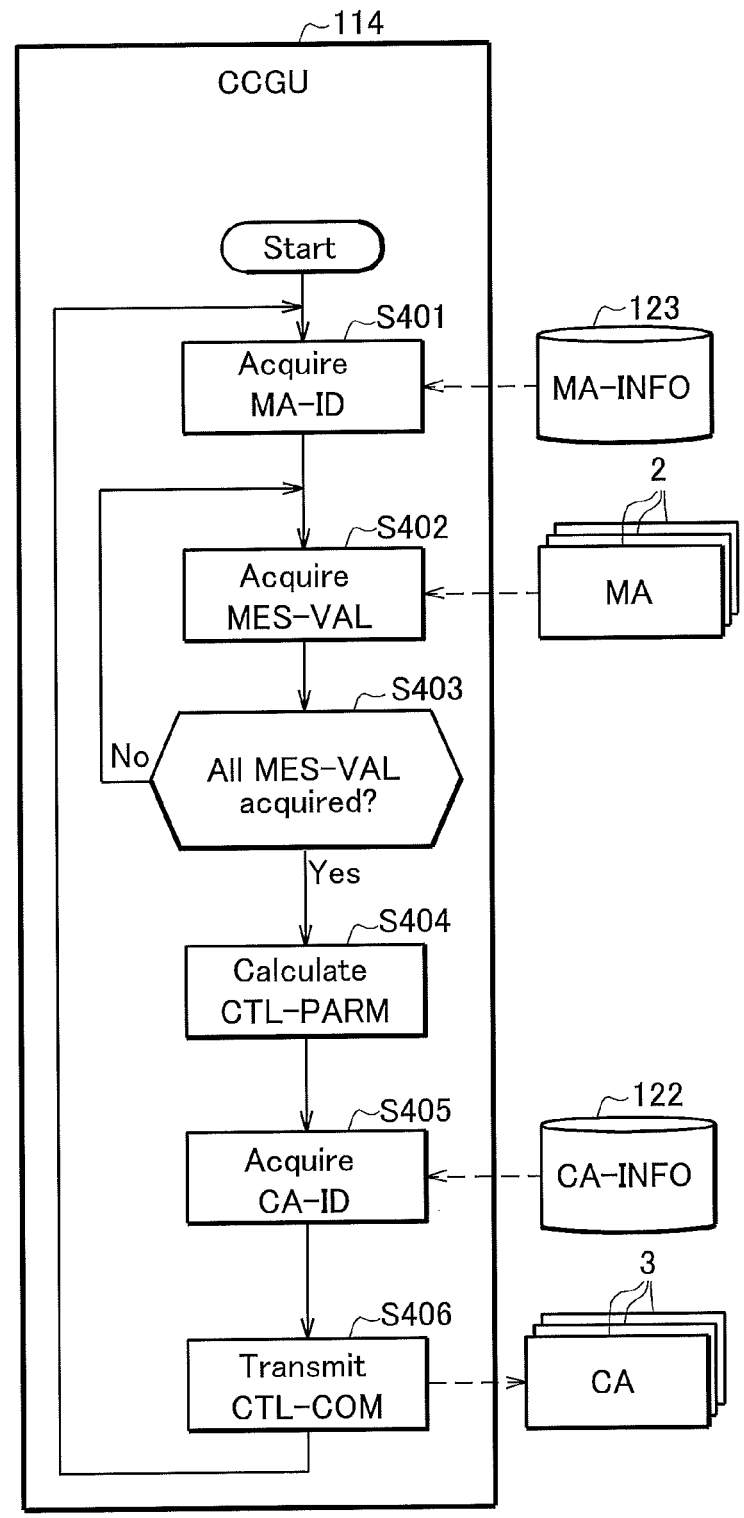
FIG. 11 is a flowchart showing a procedure of control command generation according to the first embodiment.

FIG. 11 is a flowchart showing a procedure of control command generation according to the first embodiment.

According to the flowchart, first, the control command generation unit (CCGU) 114 acquires all measuring apparatus IDs (MA-IDs) associated with the respective control apparatus IDs from the measuring apparatus information (MA-INFO) 123 (S401).

Next, the control command generation unit 114 acquires measurement values (MES-VALs) from the respective measuring apparatuses 2 indicated by the acquired measuring apparatus IDs (S402).

Then, the control command generation unit 114 determines whether or not all measurement values (MES-VALs) from the measuring apparatuses 2 corresponding to the measuring apparatus IDs acquired at step S401 have been acquired (S403).

If the result of step S403 is that not all measurement values have been acquired (S403→No), the control command generation unit 114 returns the processing to step S402, and performs acquisition of the measurement values until all the measurement values are acquired from all measuring apparatuses 2.

If the result of step S403 indicates that all measurement values have been acquired (S403→Yes), the control command generation unit 114 calculates a control parameter (CTL-PARM) to be outputted to the control apparatus 3 based on the acquired measurement values (S404). For the calculation of the control parameter, for example, the method described in NPL 1 or the like is used.

Subsequently, the control command generation unit 114 acquires the control apparatus ID (CA-ID) of the control apparatus 3 connected to the measuring apparatus 2 as a processing object from the measuring apparatus information 123 using the measuring apparatus ID (MA-ID) acquired at step S401 as a search key (S405).

Then, the control command generation unit 114 transmits a control command (CTL-COM) containing the control parameter calculated at step S404 to the control apparatus (CA) 3 having the control apparatus ID acquired at step S405 (S406), and returns the processing to step S401.

According to the first embodiment, if sensing the change of the connection relationship in the power system as a predetermined condition, the measuring apparatus extraction unit 112 extracts the measuring apparatus 2 existing between the first control apparatus 3 (e.g. SVR 310 in FIG. 4) and the second control apparatus 3 (e.g. SVR 311 in FIG. 4) at the downstream of the first control apparatus 3. Or, if there is not the second control apparatus 3, the measuring apparatus extraction unit 112 extracts the measuring apparatus 2 existing at the downstream of the first control apparatus based on the system configuration information 121. Thereby, the power system control system 6 according to the embodiment may control the control apparatus 3 described in NPL 1.

Further, as seen at step S102 in FIG. 8, when the configuration change of the power system is sensed, the measuring apparatus information 123 is generated, and thereby, the power system control system 6 according to the first embodiment may control the control apparatus 3 in response to the configuration change of the power system.

Second Embodiment

Next, the second embodiment according to the invention is described with reference to FIGS. 12 to 16.

In the second embodiment, a processing is explained in the case, for example, where a failure occurs in the control apparatus 3. Note that, explanation of the second embodiment centers on differences from the first embodiment.

<Control Command Apparatus>

Figure 12:
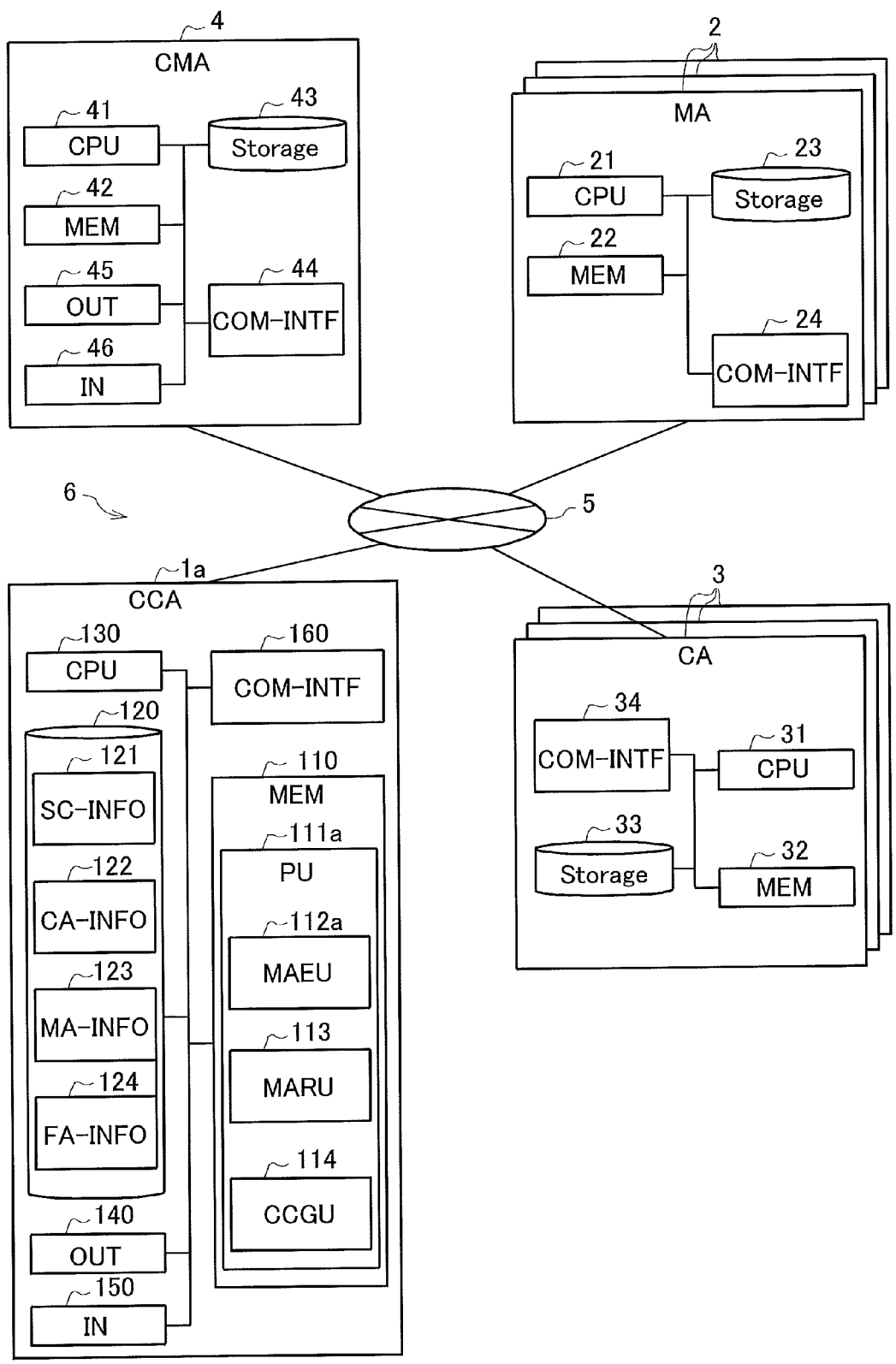
FIG. 12 is a diagram showing a configuration example of a power system control system according to the second embodiment.

FIG. 12 shows a configuration example of a power system control system according to the second embodiment.

A measuring apparatus extraction unit (MAEU) 112a in a processing unit 111a of a control command apparatus (CCA) 1a stores the control apparatus ID of a failed control apparatus (CA) 3 in failed apparatus information (FA-INFO) 124. Further, the measuring apparatus extraction unit 112a excludes the failed control apparatus 3 from a control apparatuses 3 to be included in connection information (CA-INFO) when generating the connection information. This is because, when the control apparatus 3 is failed, the control apparatus 3 is often brought to be in a conductive state (the state not to be stepped up or down).

Note that the measuring apparatus extraction unit 112a is implemented by loading a program of the measuring apparatus extraction unit 112a stored in the storage device 120 into the memory 110 of the control command apparatus 1a and execution of the program by the CPU 130.

Further, in the storage device 120 of the control command apparatus 1a, the failed apparatus information (FA-INFO) 124 is stored in addition to the system configuration information (SC-INFO) 121, the control apparatus information (CA-INFO) 122, and the measuring apparatus information (MA-INFO) 123. The failed apparatus information 124 is described below.

Figure 13:
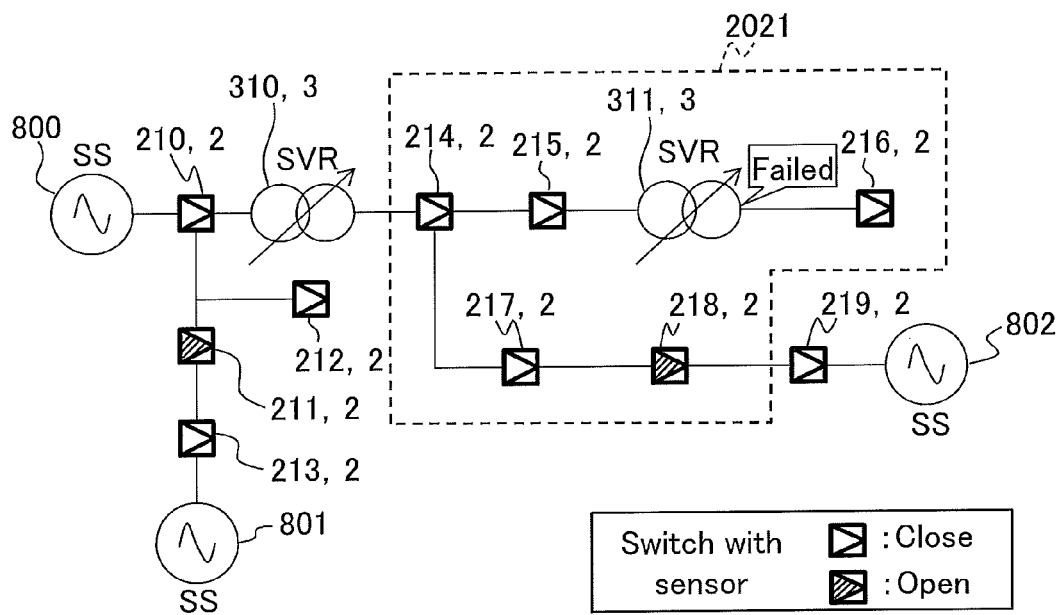
FIG. 13 is a diagram showing a configuration example of a power system according to the second embodiment.

FIG. 13 shows a configuration example of a power system according to the second embodiment.

FIG. 13 shows the power system that has the same configuration as FIG. 2, except that a failure occurs in the SVR 311. Note that the part indicated by the sign 2021 is described below.

<Failed Apparatus Information>

Figure 14:
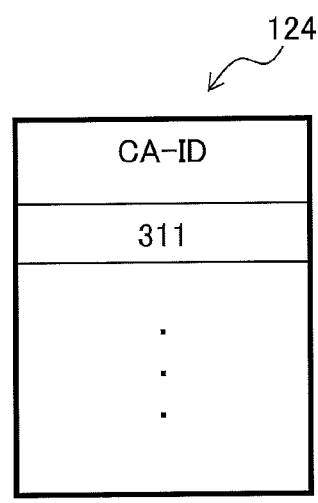
FIG. 14 is a diagram showing a configuration example of failed apparatus information according to the second embodiment.

FIG. 14 shows a configuration example of failed apparatus information according to the second embodiment.

As shown in FIG. 14, the failed apparatus information (FA-INFO) 124 has at least a field of control apparatus ID (CA-ID). That is, the failed apparatus information 124 contains the control apparatus IDs of the failed control apparatuses 3 in a list form.

<Measuring Apparatus Extraction>)

FIG. 15 is a flowchart showing a procedure of measuring apparatus extraction according to the second embodiment. Note that, in the flowchart in FIG. 15, the same step numbers are assigned to the same steps as those in FIG. 8 and the explanation is omitted.

The processing shown in FIG. 15 is executed when the measuring apparatus extraction unit (MAEU) 112a receives a failure notification for notifying a failure of the control apparatus 3 from the central management apparatus (CMA) 4. When receiving the configuration change information (CONFIG-CHG-INFO, see the first embodiment) from the central management apparatus 4, the measuring apparatus extraction unit 112a executes the processing in FIG. 8 explained in the first embodiment. That is, the measuring apparatus extraction unit 112a executes the processing shown in FIG. 8 or 15 depending on the information (configuration change information, failure notification of the control apparatus 3) received from the central management apparatus 4.

The measuring apparatus extraction unit 112a acquires a list of control apparatus IDs (CA-IDs) at step S101, and then, determines whether or not to have received a failure notification (FN) of the control apparatus 3 from the central management apparatus 4 (i.e., whether or not to have sensed the failed control apparatus 3) (S501). The notification of the control apparatus failure is transmitted in the list form of the control apparatus ID.

If the result of step S501 indicates having not received it (S501→No), the measuring apparatus extraction unit 112a returns the processing to step S501.

If the result of step S501 indicates having received it (S501→Yes), the measuring apparatus extraction unit 112a registers the control apparatus ID contained in the received failure notification of the control apparatus 3 in the failed apparatus information (FA-INFO) 124 (S502), and moves the processing to generation and transmission of connection information (CON-INFO) at step S503. Step S503 is described below with reference to FIG.

<Generation and Transmission of Connection Information>

Figure 16:
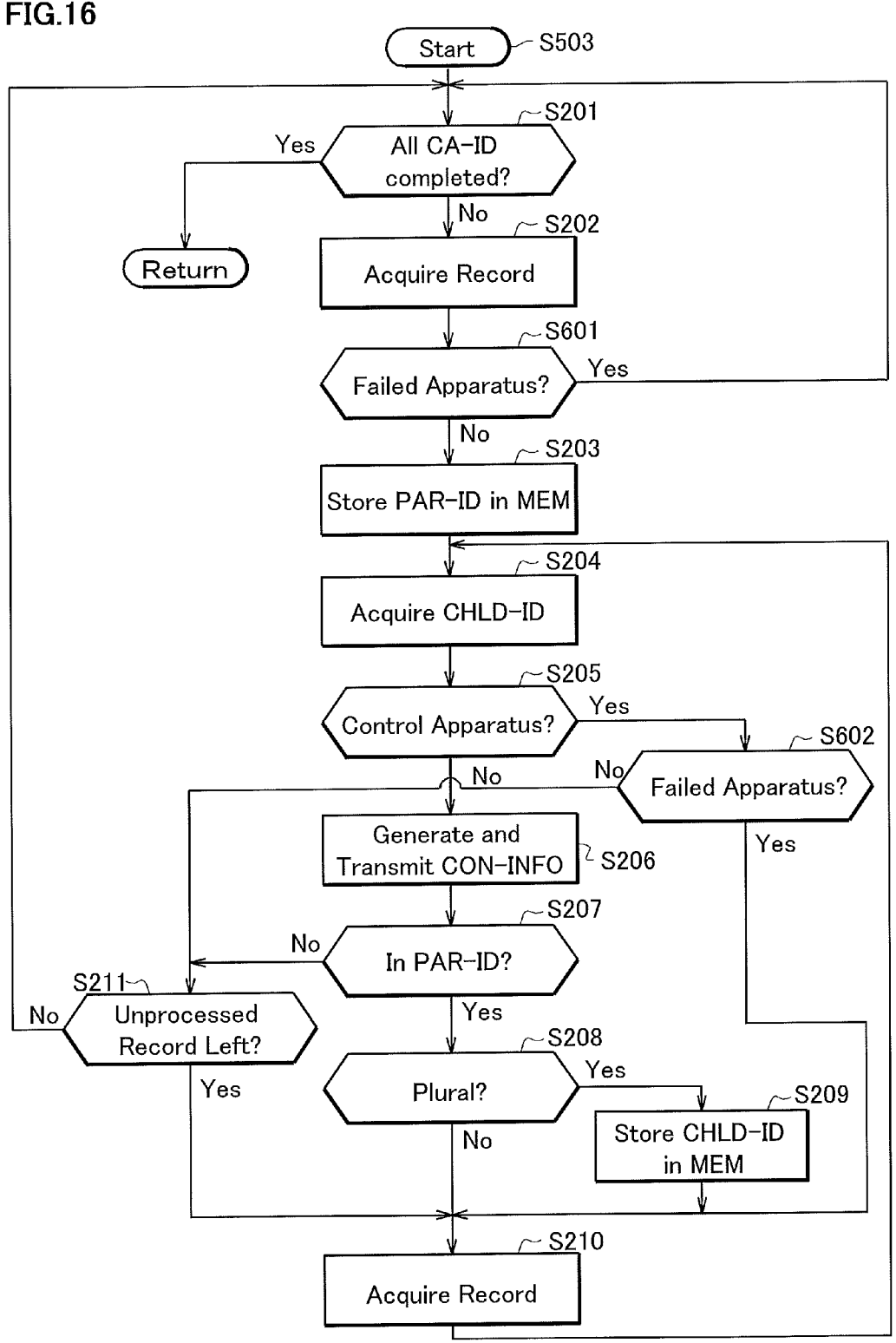
FIG. 16 is a flowchart showing a detailed procedure of connection information generation and transmission according to the second embodiment.

FIG. 16 is a flowchart showing a detailed procedure of connection information generation and transmission (S503) in FIG. 15.

As described above, the measuring apparatus extraction unit 112a executes the steps in FIG. 8 or 15 depending on the information (configuration change information or failure notification of the control apparatus 3) received from the central management apparatus 4. In the first embodiment, in the processing at step S104 in FIG. 8, the connection information generation and transmission shown in FIG. 9 is executed. However, in the second embodiment, the processing at step S104 in FIG. 8 and the processing at step S503 in FIG. 15 executes connection information generation and transmission shown in FIG. 16.

Note that, in the processing in FIG. 16, the same step numbers are assigned to the same steps as those in FIG. 9 and the explanation is omitted.

After step S202, the measuring apparatus extraction unit 112a refers to the failed apparatus information 124 to determine whether or not the apparatus having the parent apparatus ID in the record acquired at step S202 (control apparatus 3) is a failed apparatus (S601).

If the result of step S601 indicates that it is a failed apparatus (S601→Yes), the measuring apparatus extraction unit 112a returns to step S201.

If the result of step S601 indicates that it is not a failed apparatus (S601→No), the measuring apparatus extraction unit 112a moves the processing to step S203.

Then, if the result of step S205 indicates that the child apparatus ID (CA-ID) acquired at step S204 is the control apparatus 3 (S205→Yes), the measuring apparatus extraction unit 112a refers to the failed apparatus information 124 to determine whether or not the control apparatus 3 is a failed apparatus (S602).

If the result of step S602 is that it is not a failed apparatus (S602→No), the measuring apparatus extraction unit 112a moves the processing to step S211.

If the result of step S602 indicates that it is a failed apparatus (S602→Yes), the measuring apparatus extraction unit 112a moves the processing to step S210, and acquires a record having the child apparatus ID to be processed as the parent apparatus ID from the system configuration information 121 (S210).

Now, the operation of the processing in FIG. 16 is explained for the case in which the SVR 311 is failed with reference to FIG. 3.

Here, the explanation starts with acquisition of the record 4301 having the SVR 310 as the parent apparatus ID. For the records 4301, 4302, 4305, and 4306, records of connection information (310, 214), (310, 215), (310, 217), and (310, 218) are generated by the same processing as that of the first embodiment. Therefore, the explanation starts with acquisition of the record 4303 at step S210 in FIG. 16.

After acquiring the record 4303 at step S210, the measuring apparatus extraction unit 112a acquires the child ID "311" of the record 4303 at step S204.

Then, the ID "311" is contained in the control apparatus information 122 in FIG. 6, and the measuring apparatus extraction unit 112a determines "Yes" at step S205.

Subsequently, at step S602, the measuring apparatus extraction unit 112a refers to the failed apparatus information 124 in FIG. 14 to determine whether or not the control apparatus 3 with the ID stored in the cell of the child apparatus ID is a failed apparatus.

The ID "311" is contained in the failed apparatus information 124 in FIG. 14, and thus, the measuring apparatus extraction unit 112a determines "Yes" at step S602 and acquires at step S210 the record 4304 which stores the ID "311" as the parent apparatus ID from the system configuration information 121. That is, the measuring apparatus extraction unit 112a does not perform any processing with respect to the record 4303 having the failed apparatus as the child apparatus ID.

Returning to step S204, the measuring apparatus extraction unit 112a acquires the child apparatus ID "216" in the record 4304. Subsequently, the same processing as that of the first embodiment is performed, and connection information (310, 216) is generated.

In the above described manner, the connection information, for example, (310, 214), (310, 215), (310, 217), (310, 218), (310, 216) is generated and sent to the measuring apparatus registration unit 113. The measuring apparatus registration unit 113 registers the information in the measuring apparatus information 123. The range shown by the connection information is a range surrounded by a broken line 2021 in FIG. 13.

Thereby, when generating the measuring apparatus information 123, if sensing a predetermined condition, for example, the failed control apparatus 3, the measuring apparatus extraction unit 112a excludes the failed control apparatus 3 (e.g. the SVR 311 in FIG. 13) from the second control apparatuses 3 at the downstream of the first control apparatus 3 (e.g. SVR 310 in FIG. 13) and extracts the measuring apparatus 2.

The measuring apparatus information registration and the control command creation in the second embodiment have the same configuration and function as those in FIGS. 10 and 11 that have been already explained, and therefore, the explanation is omitted.

Note that excluded apparatus information for excluding apparatuses having no relation with control of SVR such as a Static Var Compensator (SVC), as well as the failed control apparatus 3 may be provided in place of the failed apparatus information 124.

According to the second embodiment, the failed control apparatus 3, the SVC, etc. are excluded to extract the connection relationship between the control apparatus 3 and the measuring apparatus 2, and thereby, appropriate control may be performed even when the failed control apparatus 3, the SVC, etc. exist in the power system.

Particularly, excluding the failed control apparatus 3 and extracting the connection relationship between the control apparatus 3 and the measuring apparatus 2 enables appropriate control even when the failure of the control apparatus 3 unexpectedly occurs.

Third Embodiment

Next, the third embodiment according to the invention is described with reference to FIGS. 17 to 26.

The third embodiment explains a processing in the case in which the control variable of the control apparatus 3 becomes a value closer to a limit value. Note that the explanation of the third embodiment centers on differences from the first embodiment. As described above, when the control apparatus 3 is an SVR or an LRT, the control parameter is set-point (reference voltage or the like) of a relay, and the control variable includes a tap number (transformation ratio), a step-up value of a voltage based on the tap number or the like.

<Control Command Apparatus>

Figure 17:
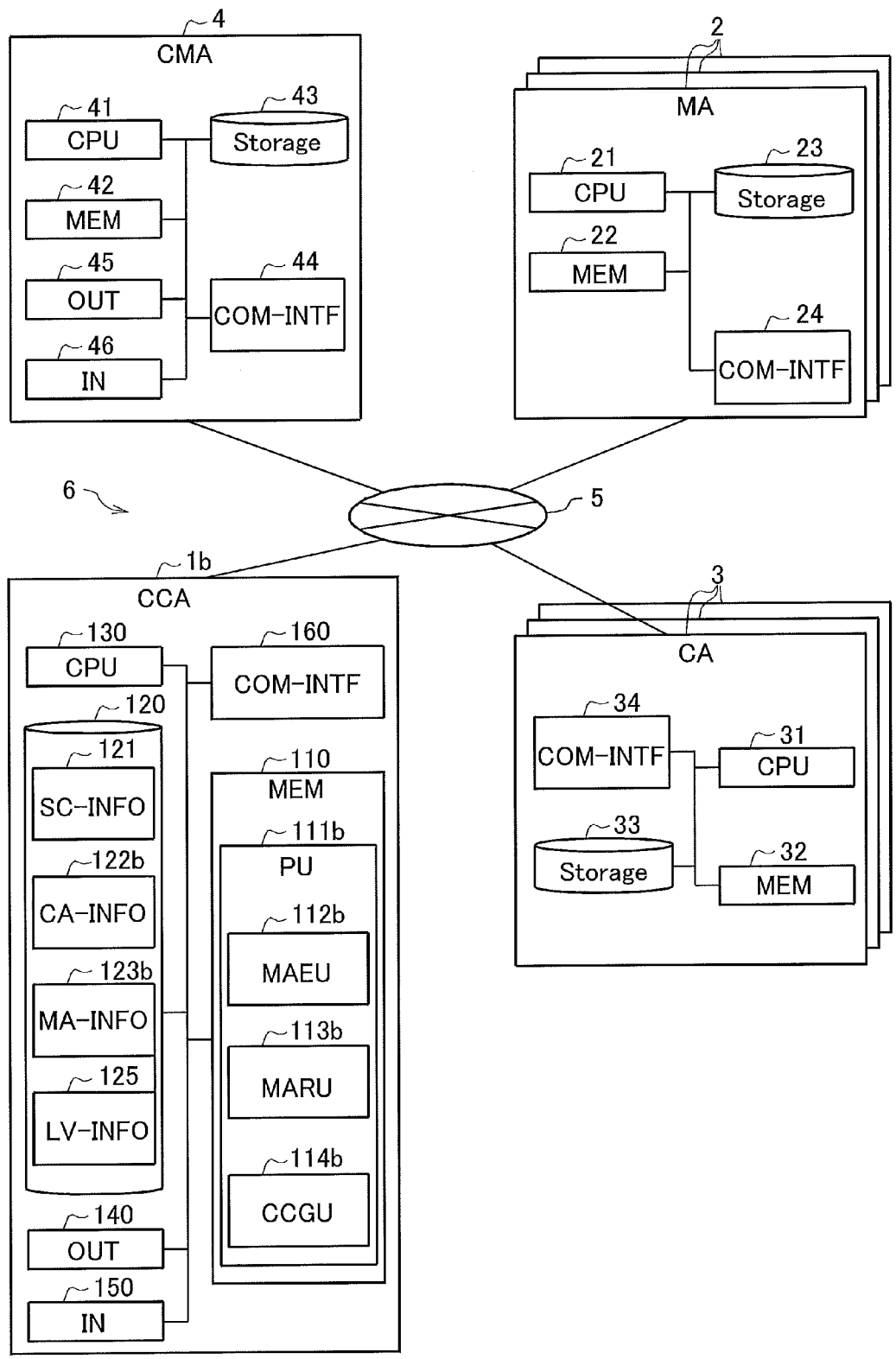
FIG. 17 is a diagram showing a configuration example of a power system control system according to the third embodiment.

FIG. 17 shows a configuration example of a power system control system according to the third embodiment.

According to the third embodiment, when a measuring apparatus extraction unit (MAEU) 112b in a processing unit (PU) 111b of a control command apparatus (CCA) 1b senses the control apparatus (CA) 3 having the control variable that has reached a limit value, the unit 112b calculates a compensation value in the control apparatus 3. Further, the measuring apparatus extraction unit 112b generates connection information of a configuration excluding the control apparatus 3 having the control variable that has reached the limit value from the configuration of the power system. Note that the unit 112b also generates connection information including the control apparatus 3 having the control variable that has reached the limit value as the parent apparatus.

Then, the measuring apparatus registration unit (MARU) 113b registers in the measuring apparatus information (MA-INFO) 123b, connection information formed by adding the compensation value to the connection information in the first or second embodiment.

Next, a control command generation unit (CCGU) 114b multiplies the measurement value sent from the measuring apparatus 2 connected to the control apparatus 3 having the control variable that has reached the limit value by the compensation value, generates a control parameter based on the measurement value multiplied by the compensation value, and transmits the generated control parameter to a control apparatus 3.

Note that the measuring apparatus extraction unit 112b, the measuring apparatus registration unit 113b, and the control command generation unit 114b are implemented by load of programs of the measuring apparatus extraction unit 112b, the measuring apparatus registration unit 113b, and the control command generation unit 114b stored in the storage device 120 into the memory 110 of the control command apparatus 1b and execution of the programs by the CPU 130.

Further, in the storage device 120 of the control command apparatus 1b, limit value information (LV-INFO) 125 is stored in addition to the system configuration information (SC-INFO) 121, control apparatus information (CA-INFO) 122b, and measuring apparatus information (MA-INFO) 123b. The limit value information 125 contains the limit value of, for example, the control variable in the control apparatus 3 existing in the power system. The limit value information 125 is described below.

Furthermore, the control apparatus information 122b and the measuring apparatus information 123b are different from those of the first embodiment, and described below.

Figures 18, 19, 20:
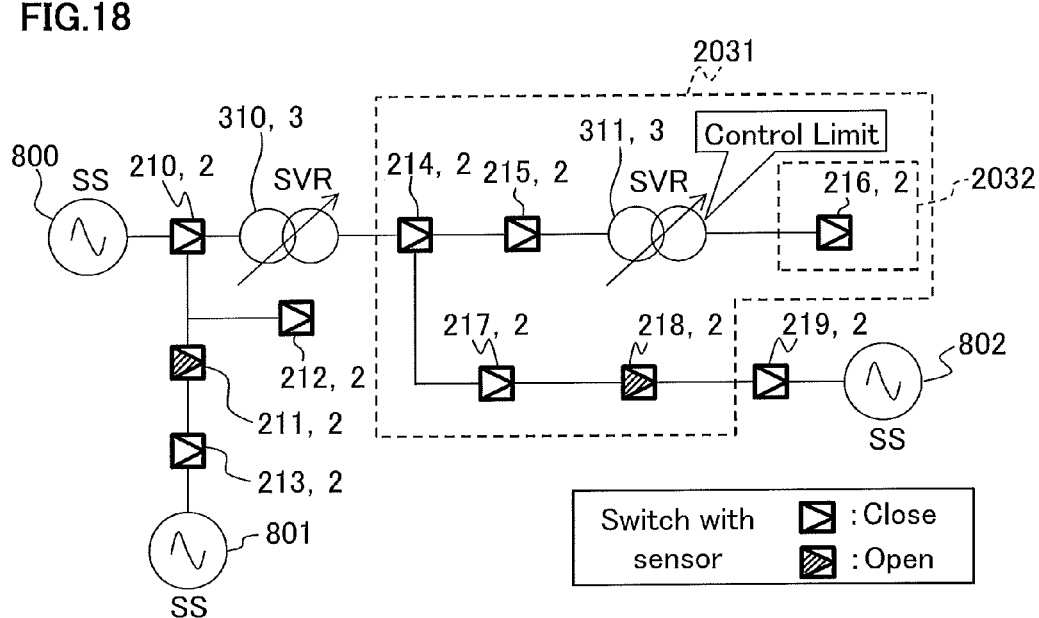
FIG. 18 is a diagram showing a configuration example of a power system according to the third embodiment.
FIG. 19 is a diagram showing an example of limit value information according to the third embodiment.
FIG. 20 is a diagram showing an example of measuring apparatus information according to the third embodiment.

FIG. 18 shows a configuration example of a power system according to the third embodiment.

FIG. 18 has the same configuration as FIG. 2 except that the control variable of the SVR 311 has reached the limit value (hereinafter "control limit state"). The area with the signs 2031 and 2032 are described below.

<Limit Value Information>

FIG. 19 shows an example of limit value information (LV-INFO) according to the third embodiment.

The limit value information record 125 has at least fields of a control apparatus ID (CA-ID), a control upper limit value (CTL-ULV), a control lower limit value (CTL-LLV), a maximum proper value (MAX-VAL), and a minimum proper value (MIN-VAL).

The control apparatus ID (CA-ID) field contains an ID for unique identification of a control apparatus 3 existing in the power system.

The control upper limit value (CTL-ULV) field contains upper limit value of a control variable that may be output by the control apparatus 3.

The control lower limit value (CTL-LLV) field contains a lower limit value of a control variable that may be output by the control apparatus 3.

The maximum proper value (MAX-VAL) field contains the maximum value of a proper control variable that may be output by the control apparatus 3.

The minimum proper value (MIN-VAL) field contains the minimum value of a proper control variable that may be output by the control apparatus 3.

A control variable from the minimum proper value to the maximum proper value is a proper control variable.

<Measuring Apparatus Information>

FIG. 20 shows an example of measuring apparatus information according to the third embodiment.

The measuring apparatus information (MA-INFO) 123b is different from the measuring apparatus information (MA-INFO) 123 according to the first embodiment in that a field of compensation value (CMPS-VAL) is added.

The compensation value is a value by which the measurement value from a specific measuring apparatus 2 is multiplied for resolving a control limit state in a control apparatus 3 that has reached the control limit state.

In the example of FIG. 18, since the SVR 311 as the control apparatus 3 has reached the control limit state, a value obtained by multiplying the measurement value from the switch with sensor 216 connected to the downstream of the SVR 311 by the compensation value is used as an input value in the SVR 310. Note that the measurement value in the SVR 311 from the switch with sensor 216 is not multiplied by the compensation value. The meaning of the multiplication by the compensation value is described below.

<Control Apparatus Information>

Figure 21:
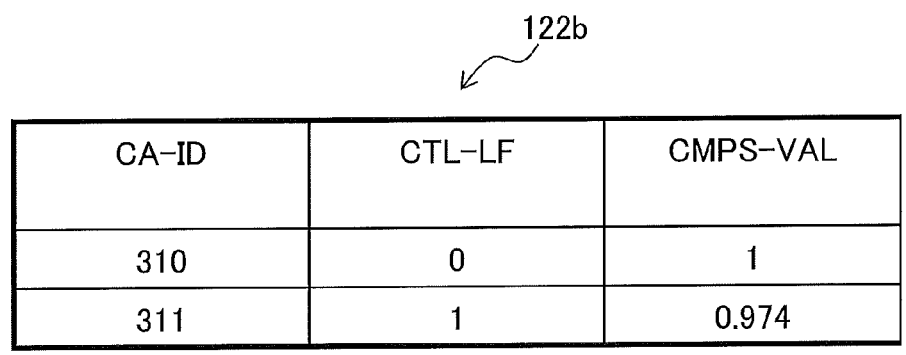
FIG. 21 is a diagram showing an example of control apparatus information according to the third embodiment.

FIG. 21 shows an example of control apparatus information according to the third embodiment.

The control apparatus information (CA-INFO) 122b is different from the control apparatus information 122 according to the first embodiment in that fields of a control limit flag (CTL-LF) and a compensation value (CMPS-VAL) are added.

The control limit flag is a flag for indicating the control apparatus 3 having the control variable that has reached the control upper limit value or the control lower limit value (the control apparatus 3 that has reached the control limit state). Here, the flag "1" is associated with the control apparatus 3 that has reached the control limit state and the flag "0" is associated with the other control apparatuses 3.

The compensation value is stored being associated with the control apparatus 3 (here, the control apparatus ID "310") which is to be controlled using the compensation value.

Note that the control limit flag may be omitted.

<Measuring Apparatus Extraction>

FIG. 22 is a flowchart showing a procedure of measuring apparatus extraction according to the third embodiment. Note that, in the process in FIG. 22, the same step numbers are assigned to the same steps as those in FIG. 8 and the explanation is omitted.

The process shown in FIG. 22 is a process executed when the measuring apparatus extraction unit 112b senses that a control variable in a control apparatus 3 has reached the limit value. When receiving the configuration change information (see the first embodiment) from the central management apparatus 4, the measuring apparatus extraction unit 112b executes the process in FIG. 8 explained in the first embodiment. That is, the measuring apparatus extraction unit 112b executes the process shown in FIG. 8 or 22 depending on the information (configuration change information, information indicating that the control variable has reached the limit value) received by the control command apparatus (CCA) 1b.

First, the measuring apparatus extraction unit (MAEU) 112b acquires a list of control apparatus IDs at step S101, and then, determines whether or not to have received the control variable (CTL-VAR) from a control apparatus 3 (S701).

If the result of step S701 indicates having not received the control variable (S701→No), the measuring apparatus extraction unit 112b returns the processing to step S701.

If the result of step S701 indicates having received the control variable (S701→Yes), the measuring apparatus extraction unit 112b refers to the limit value information 125 to determine whether or not the received control variable is a limit value (i.e., whether or not to have sensed the control apparatus that has reached the control limit state) (S702).

If the result of step S702 indicates that the received control variable is not the limit value (S702→No), the measuring apparatus extraction unit 112b returns the processing to step S701.

If the result of step S702 is that the received control variable has reached the limit value (S702→Yes), the measuring apparatus extraction unit 112b registers a control limit flag (CTL-LF) "1" in the control apparatus information 122b (S703). In this regard, the measuring apparatus extraction unit 112b registers "1" in a cell of the control limit flag in association with the control apparatus ID of the control apparatus 3 sensed to have the control variable having reached the limit value at step S702. Then, the measuring apparatus extraction unit 112b calculates a compensation value (CMPS-VAL) to the control variable in the control apparatus 3 having reached the limit value (S704). The compensation value can be obtained by a control upper limit value (CTL-ULV)÷maximum proper value (MAX-VAL) or a control lower limit value (CTL-LLV)÷minimum proper value (MIN-VAL) for the control apparatus 3 having the control variable having reached the limit value.

Then, the measuring apparatus extraction unit 112b registers the calculated compensation value in the cell of the compensation value field (CMPS-VAL) in the control apparatus information 122b (S705), and moves the processing to generation and transmission of connection information at step S706. At step S705, the measuring apparatus extraction unit 112b registers the compensation value in association with the control apparatus ID of the control apparatus 3 sensed to have the control variable having reached the limit value at step S702. Step S706 is described below with reference to FIG. 23.

For example, in the case in which the control variable received from the SVR 311 in FIG. 18 is "6270", it is found out that the control variable in the SVR 311 has reached the control lower limit value with reference to the limit value information 125 in FIG. 19. That is, the SVR 311 has reached the control limit state.

Then, in this case, the minimum proper value of the SVR 311 is "6435" in the limit value information 125 in FIG. 19, and therefore, the measuring apparatus extraction unit 112b calculates "6270÷6435=0.974" as the compensation value of the measurement value obtained from the measuring apparatus 2 connected to the downstream side of the SVR 311. Note that the compensation value is set to "1" for the control apparatus 3 that has not reached the control limit state.

<Connection Information Generation and Transmission>

Figure 23:
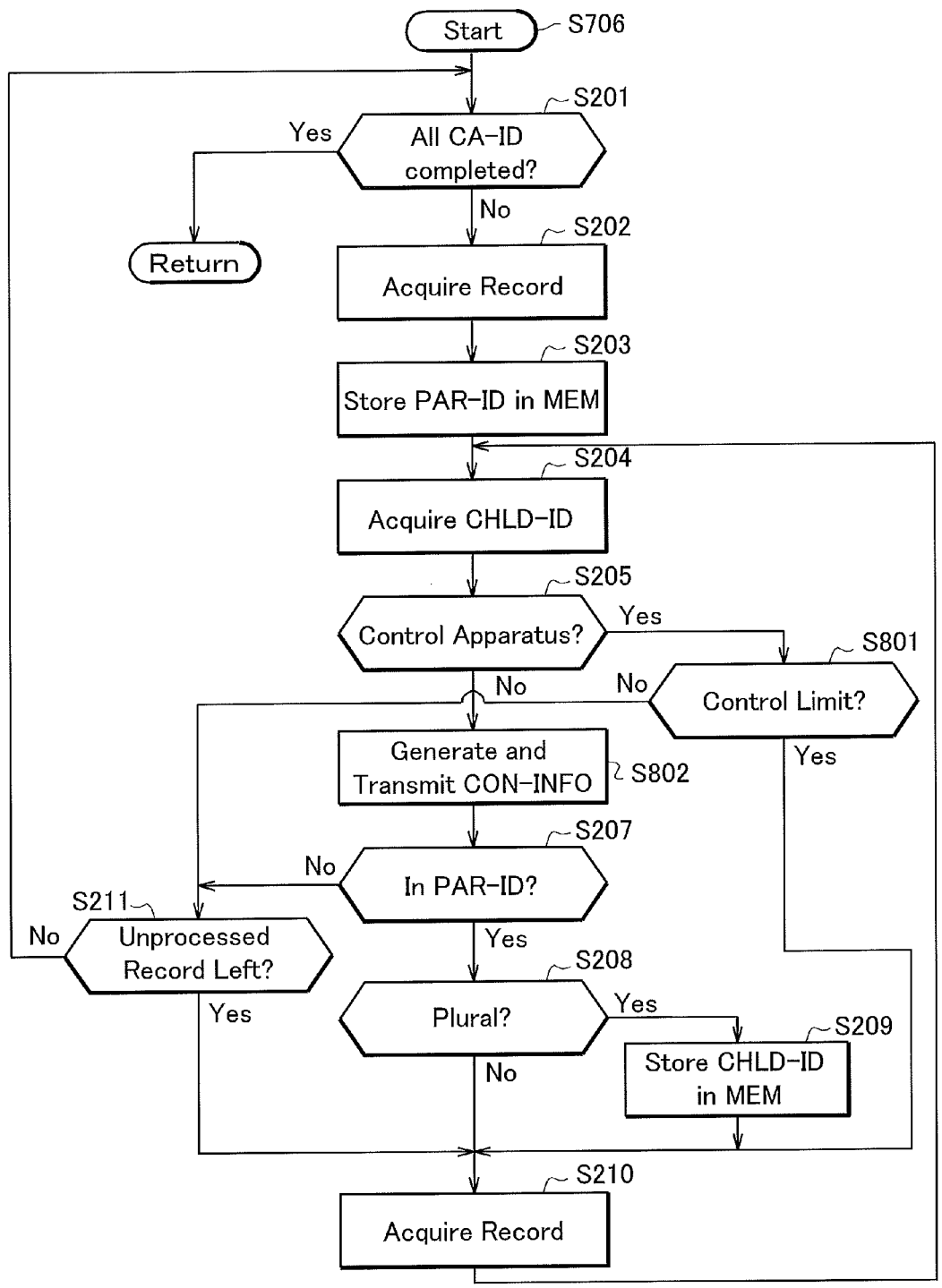
FIG. 23 is a flowchart showing a detailed procedure of connection information generation and transmission according to the third embodiment.

FIG. 23 is a flowchart showing a detailed procedure of connection information generation and transmission (S706) in FIG. 22.

As described above, the process in FIG. 8 or 22 is executed by the measuring apparatus extraction unit (MAEU) 112b depending on the information (configuration change information or information indicating that the control variables has reached the limit value) received by the control command apparatus (CCA) 1b. In the first embodiment, step S104 in FIG. 8 executes the connection information generation and transmission shown in FIG. 9 However, in the third embodiment, the step S104 in FIG. 8 and the step S706 in FIG. 22 executes the connection information generation and transmission shown in FIG. 23.

Note that, in the process in FIG. 23, the same step numbers are assigned to the same steps as those in FIG. 9 and the explanation is omitted.

If the result of step S205 indicates that the child apparatus ID acquired at step S204 is a control apparatus 3 (S205→Yes), the measuring apparatus extraction unit 112b refers to the control limit flag (CTL-LF) of the control apparatus information 122b in FIG. 21 to determine whether or not the control apparatus 3 has reached the control limit state (S801). Note that, when the control limit flag is omitted in the control apparatus information 122b, the registered compensation value (CMPS-VAL) serves as the control limit flag.

If the result of step S801 indicates that the control apparatus 3 has reached the control limit state (S801→Yes), the measuring apparatus extraction unit 112b moves the processing to step S210, and acquires the record having the child apparatus ID to be processed as the parent apparatus ID from the system configuration information (SC-INFO) 121 (S210).

In contrast, if the result of step S801 indicates that the control apparatus 3 has not reached the control limit state (S801→No), the measuring apparatus extraction unit 112b moves the processing to step S211.

If the result of step S205 indicates that the child apparatus ID acquired at step S204 is not a control apparatus 3 (S205→No), the measuring apparatus extraction unit 112b performs generation and transmission of connection information (S802).

Here, the connection information generated and transmitted at step S802 takes a form of (control apparatus ID (CA-ID), measuring apparatus ID (MA-ID), and compensation value (CMPS-VAL)) different from that of the first and second embodiments.

And, step S802 includes the following steps.

(a1) The measuring apparatus extraction unit 112b refers to the system configuration information (SC-INFO) 121 and the control apparatus information (CA-INFO) 122b to determine whether or not the control apparatus 3 having reached the control limit state exists between the control apparatus 3 corresponding to the parent apparatus ID (control apparatus ID) stored in memory 110 at step S203 and the measuring apparatus 2 being currently processed.

(a2) If the result of the processing of (a1) indicates that no control apparatus 3 having reached the limit state exists, the measuring apparatus extraction unit 112b generates and sends connection information of (control apparatus ID, measuring apparatus ID, "1") to the measuring apparatus registration unit (MARU) 113b. Here, the control apparatus ID contained in the connection information is the parent apparatus ID (control apparatus ID) stored in memory 110 at step S203 and the measuring apparatus ID is the ID of the measuring apparatus to be processed.

(a3) If the result of the processing of (a1) indicates that a control apparatus 3 having reached the control limit state exists, the measuring apparatus extraction unit 112b refers to the control apparatus information 122b to acquire the compensation value, generates connection information containing the acquired compensation value, and sends it to the measuring apparatus registration unit 113b.

Now, an explanation is made of the operation of the process in FIG. 23 in the case in which the SVR 311 has reached the control limit state with reference to FIG. 3.

Here, the explanation starts with acquisition of the record 4301 having the SVR 310 in the cell of the parent apparatus ID, and regarding the records 4301, 4302, 4305, and 4306, connection information records (310, 214, 1), (310, 215, 1), (310, 217, 1), and (310, 218, 1) are generated by the same process as that of the first embodiment. Therefore, the explanation starts with acquisition of the record 4303 at step S210 in FIG. 23.

After acquiring the record 4303 at step S210, the measuring apparatus extraction unit 112b acquires the child ID "311" in the record 4303 at step S204.

Then, the ID "311" is found out to be stored in the record of the control apparatus information 122b in FIG. 21, and therefore, the measuring apparatus extraction unit 112b determines "Yes" at step S205.

Subsequently, at step S801, the measuring apparatus extraction unit 112b refers to the control limit flag of the control apparatus information 122b in FIG. 21 to determine whether or not the control apparatus 3 stored in the cell of the child apparatus ID has reached the control limit state.

The control variable of the control apparatus with ID "311" is found out to have reached the limit value (control limit) from the control apparatus information 122b in FIG. 21, and thus, the measuring apparatus extraction unit 112b determines "Yes" at step S801 and moves the processing to step S210 to acquire the record 4304 contained with the ID "311" as the parent apparatus from the system configuration information 121. That is, the measuring apparatus extraction unit 112b does not perform any process on the record 4303 having the apparatus that has reached the control limit state as the child apparatus ID.

Returning to step S204, the measuring apparatus extraction unit 112b acquires the child apparatus ID "216" in the record 4304.

At the subsequent step S802, the measuring apparatus extraction unit 112b refers to the system configuration information 121 and the control apparatus information 122b to determine whether or not there exists the control apparatus 3 having reached the control limit state between the control apparatus 3 corresponding to the parent apparatus ID (control apparatus ID) stored in memory 110 at step S203 and the measuring apparatus 2 being currently processed.

Here, the SVR 311 is found to exist between the switch with sensor 216 and the control apparatus 3 (SVR 310) indicated by the parent apparatus ID stored in memory 110 at step S203 from the system configuration information 121. Then, the SVR 311 is found to have reached the control limit state from the control apparatus information 122b.

Therefore, the measuring apparatus extraction unit 112b determines that there exists the control apparatus 3 having reached the control limit state between the control apparatus 3 corresponding to the parent apparatus ID (control apparatus ID) stored in memory 110 at step S203 and the measuring apparatus 2 being currently processed.

Subsequently, the measuring apparatus extraction unit 112b refers to the control apparatus information 122b to acquire the compensation value "0.974" stored in association with the control apparatus ID "311" that exists between the control apparatus ID "310" stored in memory 110 at step S203 and the switch with sensor 216 as the object being processed and has reached the control limit state.

Then, the measuring apparatus extraction unit 112b generates connection information (310, 216, 0.974).

Then, when the record 4304 is acquired at step S202, the same process is performed and connection information (311, 216, 1) is generated and transmitted. Note that, when the record 4304 is an object to be processed, no control apparatus 3 is found to exist between the switch with sensor 216 and the control apparatus 3 (SVR 311) indicated by the parent apparatus ID stored in memory 110 at step S203 from the system configuration information 121. Therefore, at step S802, the measuring apparatus extraction unit 112b generates and transmits connection information (311, 216, 1) with the compensation value set to "1".

In the above described manner, the connection information records, for example, (310, 214, 1), (310, 215, 1), (310, 216, 0.974), (310, 217, 1), (310, 218, 1) are generated and sent to the measuring apparatus registration unit 113b. This connection information reflects the range surrounded by a broken line 2031 in FIG. 18.

Further, the connection information of (311, 216, 1) is also generated. This reflects the range surrounded by a broken line 2032 in FIG. 18.

The measuring apparatus registration unit (MARU) 113b registers the information in the measuring apparatus information (MA-INFO) 123b, and thereby, generates the measuring apparatus information (MA-INFO) 123b as shown in FIG. 20.

In the above described manner, when generating the measuring apparatus information 123b, the measuring apparatus extraction unit 112b excludes the control apparatus 3 having reached the control limit state (e.g., the SVR 311 in FIG. 18) among the second control apparatuses located at the downstream of the first control apparatus 3 (e.g. SVR 310 in FIG. 18) and extracts the measuring apparatus 2, if sensing the existence of the control apparatus 3 having the control variable that has reached the control limit as a predetermined condition.

Note that, in the third embodiment, the connection information generated at step S104 in FIG. 8 and step S706 in FIG. 22 has the form of (control apparatus ID, measuring apparatus ID, compensation value), but that the processing in FIG. 23 called via the step S104 in FIG. 8, makes the compensation value "1" in every cell of the generated connection information.

<Measuring Apparatus Information Registration>

Figure 24:
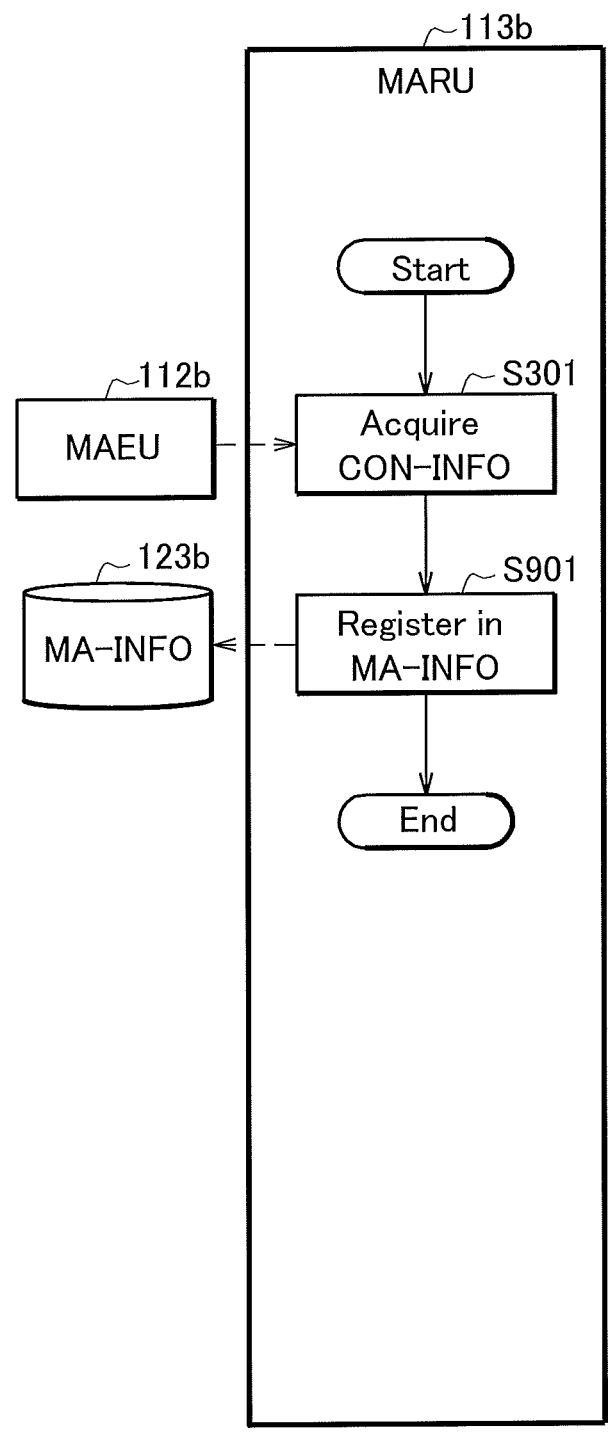
FIG. 24 is a flowchart showing a procedure of measuring apparatus information registration according to the third embodiment.

FIG. 24 is a flowchart showing a procedure of measuring apparatus information registration according to the third embodiment. In FIG. 24, the same step numbers are assigned to the same steps as those in FIG. 10 and the explanation is omitted.

The measuring apparatus registration unit 113b that has acquired the connection information (CON-INFO) containing the compensation value at step S301 sequentially registers the acquired connection information (containing the compensation values) in the measuring apparatus information (MA-INFO) 123b (S901). In this regard, the measuring apparatus registration unit 113b once deletes data contained in the measuring apparatus information 123b, and then, stores the connection information newly acquired at step S301 in the measuring apparatus information 123b.

<Control Command Generation>

Figure 25:
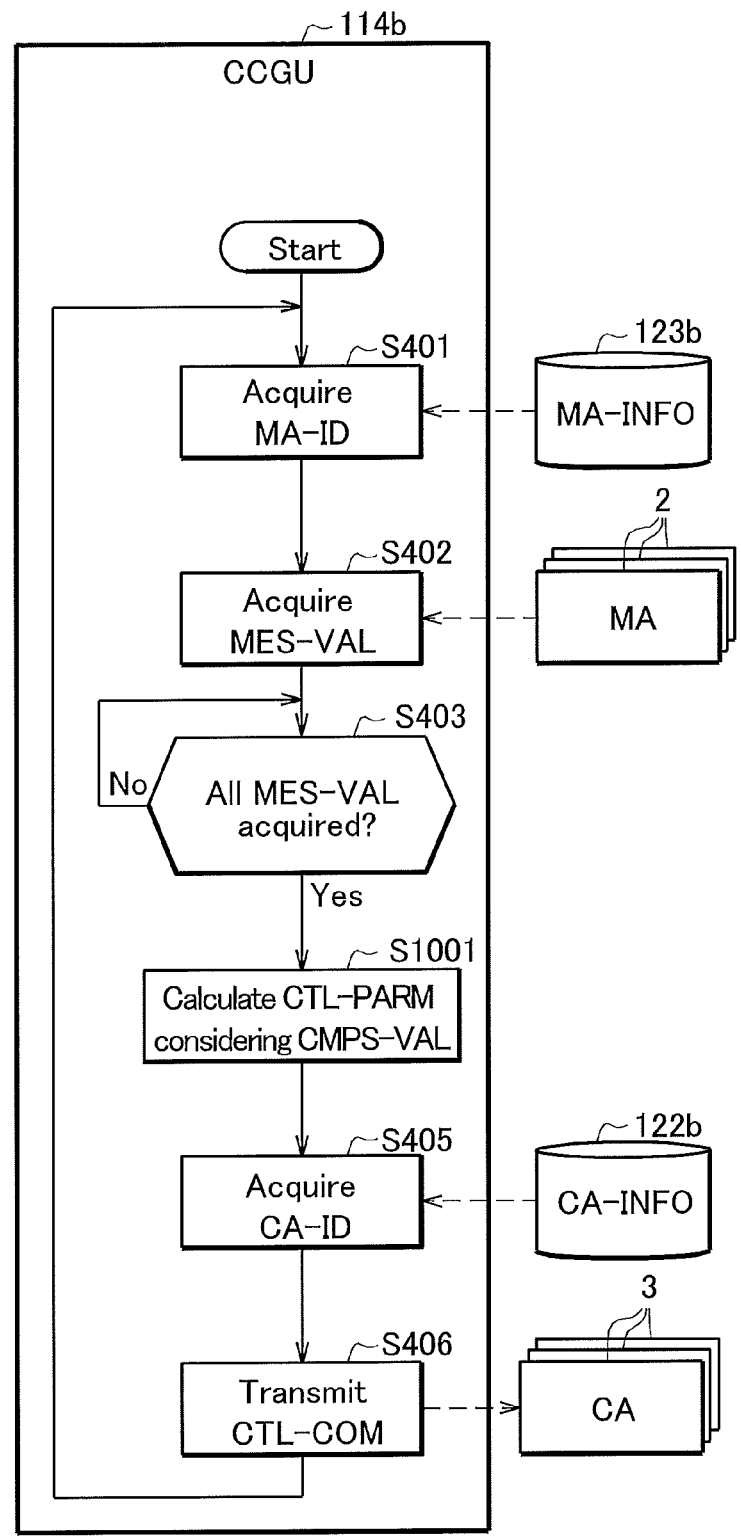
FIG. 25 is a flowchart showing a procedure of control command generation according to the third embodiment.

FIG. 25 is a flowchart showing a procedure of control command generation according to the third embodiment. In FIG. 25, the same step numbers are assigned to the same steps as those in FIG. 11 and the explanation is omitted.

If the result of step S403 indicates that all measurement values have been acquired (S403→Yes), the control command generation unit (CCGU) 114b calculates a control parameter (CTL-PARM) by taking the compensation value (COPMS-VAL) into consideration (S1001). Here, taking the compensation value into consideration means, for example, to use the value obtained by multiplying the acquired measurement values by the compensation value for the measurement values.

<Compensation Value>

Now, explanation is made of the meaning of calculating the compensation value with reference to FIGS. 26A and 26B.

FIGS. 26A and 26B show variations of voltage values in the power system of SS 800→switch with sensor 210→SVR 310→switch with sensor 214→switch with sensor 215→SVR 311→switch with sensor 216 in FIG. 18.

In the graphs of FIGS. 26A and 26B, the vertical axis indicates a voltage value and the horizontal axis indicates a distance. According to distances on the horizontal axis, the configurations of the power systems are described in the upper part of FIGS. 26A and 26B.

That is, signs 2501, 2511 in FIGS. 26A and 26B are sings of secondary-side voltage values of the SVR 310; and signs 2502, 2512 are signs of voltage values at the spot of the switch with sensor 214. Similarly, signs 2503, 2513 are sings of voltage values at the spot of the switch with sensor 215; signs 2504, 2514 are signs of secondary-side voltage values of the SVR 311, and signs 2505, 2515 are signs of voltage values at the spot of the switch with sensor 216.

Further, the "managed lower-limit voltage value" indicated in FIGS. 26A and 26B is a voltage value below which the law prohibits a voltage in a power system from dropping.

As shown by a solid line in a graph of FIG. 26A, the voltage value rapidly falling with the distance is stepped up by the SVR 310, and then, stepped up by the SVR 311 again.

Here, the scale marks on the vertical line at the SVR 310, 311 in the graph of FIGS. 26A and 26B indicate the numbers of taps.

That is, the voltage in FIG. 26A is stepped up by one tap in the SVR 310 and by five taps in the SVR 311. Here, assuming that the limit values for SVR 310 and 311 (step-up ratio or step-down ratio as limits) are both five taps, it is found that the step-up ratio of the SVR 311 has reached the limit value.

Accordingly, the measuring apparatus extraction unit 112b multiplies the voltage value (indicated by sign 2505) of the switch with sensor 216 by the compensation value so that the step-up ratio in the SVR 311 becomes the maximum proper value. Here, it is assumed that the minimum proper values or maximum proper values in SVR 310 and 311 are both three taps. That is, it is assumed that the proper values in SVR 310 and 311 are in a range of +3-tap step-up and −3-tap step-down.

Accordingly, in the examples of FIGS. 26A and 26B, the compensation value is calculated for calculating the voltage value of the switch with sensor 216 when the SVR 311 is stepped down by two taps. This compensation value is, e.g. the above described "0.974".

The voltage value of the switch with sensor 216 multiplied by the compensation value is lowered from the value indicated by the sign 2505 to the value indicated by the sign

2506. This value is inputted to the SVR 310, not to the SVR 311. Note that the voltage value of the switch with sensor 216 inputted to the SVR 311 remains the value indicated by the sign 2505 without multiplication by the compensation value.

Here, it should be noted that the voltage value 2506 multiplied by the compensation value is not an actual voltage value, but just a hypothetical value for management.

As shown in FIG. 26A, the voltage value indicated by the sign 2506 is in the vicinity of the managed lower-limit voltage value, and therefore, the SVR 310 steps up the voltage value of the switch with sensor 216 to a proper value by increasing the number of taps. Specifically, the voltage is stepped up by two taps.

Then, as shown in FIG. 26B, the SVR 311 steps down by the number of taps by which the SVR 310 steps up. That is, the SVR 311 can step down by the step-up amount of the SVR 310, and thereby, the critical operation of the SVR 311 at the limit value can be resolved.

Specifically, when the SVR 310 steps up by two taps, the primary-side voltage value (input voltage value) of the SVR 311 is stepped up by two taps. Accordingly, the secondary-side voltage value of the SVR 311 is also stepped up by two taps. Then, the voltage value of the SVR 311 is wholly stepped up by two taps, and eventually the SVR 311 can step down the step-up ratio of itself by two taps. This process is achieved by application of the technology described in NPL 1. As the result, the state shown by the graph in FIG. 26B is obtained.

Note that, in the third embodiment, the measuring apparatus extraction unit 112b executes the process shown in FIG. 8 or 22 depending on the information (configuration change information, information indicating that the control variable has reached the limit value) received by the control command apparatus 1b, and in addition to the above information, the failure notification of the control apparatus 3 may cause execution of the process in FIG. 15. That is, the measuring apparatus extraction unit 112b may execute the process shown in FIG. 8, 15, or 22 depending on the information (configuration change information, failure notification of the control apparatus 3, information indicating that the control variable has reached the limit value) received from the central management apparatus 4.

In this case, in the process of FIG. 23, the step S601 in FIG. 16 is executed between step S202 and step S203. Further, in the processing of FIG. 23, step S602 in FIG. 16 is executed between step S205 and step S801. That is, if the result of step S205 is that the child apparatus ID acquired at step S204 is the control apparatus 3 (S205→Yes), the measuring apparatus extraction unit 112b refers to the failed apparatus information 124 to determine whether or not the control apparatus 3 is a failed apparatus (S602 in FIG. 16).

If the result of the step S602 indicates that the control apparatus 3 is not a failed apparatus (S602→No), the measuring apparatus extraction unit 112b moves the processing to step S801 in FIG. 23.

If the result of step S602 indicates that the control apparatus 3 is a failed apparatus (S602→Yes), the measuring apparatus extraction unit 112b moves the processing to step S210.

According to the third embodiment, even when there exists the control apparatus 3 having the control variable that has reached the limit value, calculation is made for the control parameter in the control apparatus 3 at the upstream side by multiplying the measurement value of the measuring apparatus 2 connected to the control apparatus 3 having the control variable that has reached the limit value by the compensation value. In this manner, the control parameter in the control apparatus 3 at the upstream side is changed based on the measurement value multiplied by the compensation value, which resolves the control limit state of the control apparatus 3 having the control variable that has reached the limit value.

Particularly, the control command generation unit 114b calculates the compensation value such that the control variable of the control apparatus 3 having reached the control limit state becomes a proper control variable, and thereby, the control variable of the control apparatus 3 having reached the control limit state can be made to be a proper value.

Note that the invention is not limited to the above described embodiments, but includes various modified examples.

For example, in the configurations of the power system control system 6 in FIGS. 1, 12, and 17, the control command apparatus (CCA) 1, 1a, and 1b and the control apparatuses (CAs) 3 are separated. However, the control apparatus 3 may have the function of the control command apparatus 1, 1a, and 1b.

Further, in the above embodiments, the control command apparatus 1, 1a, and 1b calculates the control parameter, but, not limited to that. The control command apparatus may calculate the control variables for the control apparatus 3.

Further, in the above embodiments, the control apparatuses 3 are connected to the central management apparatus (CMA) 4, the measuring apparatuses (MAs) 2, and the control command apparatus (CCA) 1, 1a, and 1b via the communication path 5. However, the control apparatuses 3 may be connected to the control command apparatus 1, 1a, or 1b only via a dedicated line. In this case, the system is configured such that each of the control command apparatus 1, 1a, or 1b is attached to one control apparatus 3.

Furthermore, in the record of the measuring apparatus information 123 and 123b of the embodiments, the control apparatus IDs and the measuring apparatus IDs are stored with one-to-one correspondence, but not limited to that. For each of the control apparatus IDs, the measuring apparatus IDs extracted by the measuring apparatus extraction unit 112 or 112b from the system configuration information 121 as being connected to the control apparatus having the IDs may be collectively stored.

Further, in the second embodiment, the control command apparatus 1a receives the failure notification of the control apparatus 3 from the central management apparatus 4, but, may receive it directly from the failed control apparatus 3.

And, in the above embodiment, the control parameter is calculated using only the measurement values from the measuring apparatus 2, but, may be calculated by using measurement values measured by the control apparatus 3.

Further, at step S702 in FIG. 22 in the third embodiment, the control limit state is determined based on the equivalence of the control variable received from the control apparatus 3 with the control upper limit value or control lower limit value. However, the control limit state may be determined depending on that the control variables are within a predetermined value from the control upper limit value or the control lower limit value.

Furthermore, in the third embodiment, the compensation value is set to the value of the control upper limit value divided by the maximum proper value or the control lower limit value divided by the minimum proper value. However, the divisors of these equations may take any values as long as they are in a range of the maximum proper value and the minimum proper value (i.e., proper values)

Further, in the second embodiment, the connection information generation and transmission is performed in either case in which the change of the system configuration occurs or the failure notification of the control apparatus 3 is received. However, the connection information generation and transmission may be performed only when the failure notification of the control apparatus 3 is received. That is, even when the change of the system configuration occurs, the control command apparatus 1a does not perform the connection information generation and transmission, and the control command apparatus 1a may perform the connection information generation and transmission only when receiving the failure notification of the control apparatus 3.

Similarly, in the third embodiment, the connection information generation and transmission may be performed only when the control apparatus 3 having reached the control limit state is sensed. That is, even when the change of the system configuration occurs, the control command apparatus 1b does not perform the connection information generation and transmission, but may perform the connection information generation and transmission only when sensing the control apparatus 3 having reached the control limit state.

Or, the connection information generation and transmission may be performed when the failure notification of the control apparatus 3 is received or when the control apparatus 3 having reached the control limit state is sensed.

The above described embodiments are explained in detail, for example, for clear explanation of the invention, and not necessarily limited to those including all of the explained configurations. Further, a part of configuration of one of the embodiments may be replaced by a configuration of another embodiment, and a configuration of one of the embodiment may be added to a configuration of another embodiment. Furthermore, a part of the configuration of each embodiment may be added to, or replaced with other configurations.

Further, the power system control system 6 in the embodiments may be applied to a power system of an industrial system, a railroad system, a transportation system, or the like.

Further, apart or all of the above described configurations, functions, processing units of 111 to 114, 112a, 112b, and 114b, and the storage device 120, etc. may be implemented by hardware by a design with, for example, an integrated circuit or the like. A program for achieving each function, information such as tables, files, etc. may be stored not only in Hard Disks (HDs: storage devices 23, 33, 43, and 120), but also in storage devices such as memories or Solid State Drives (SSDs), or recording media such as Integrated Circuit (IC) cards, Secure Digital (SD) cards, or Digital Versatile Discs (DVDs).

Furthermore, in the respective embodiments, the control lines and the information lines are shown for those considered to be needed to explain, and not all control lines and information lines in products are necessarily shown. In real products, it may be considered that almost all configurations are mutually connected.

REFERENCE SIGNS LIST

1 control command apparatus (CCA)
2 measuring apparatus (MA)
3 control apparatus (CA)
4 central management apparatus (CMA)
6 power system control system
111, 111a, 111b processing unit (PU)
112, 112a, 112b measuring apparatus extraction unit (MAEU)
113, 113b measuring apparatus registration unit (MARU)
114, 114b control command generation unit (CCGU)
121 system configuration information (SC-INFO)
122, 122b control apparatus information (CA-INFO)
123 measuring apparatus information (MA-INFO)
123b measuring apparatus information (MA-INFO, containing compensation value)
124 failed apparatus information (FA-INFO)
125 limit value information (LV-INFO)

The invention claimed is:

1. A control command apparatus in a power system, the control command apparatus comprising:
    a storage unit configured to store system configuration information including a connection relationship between one or more control apparatuses and one or more measuring apparatuses;
    a measuring apparatus data extraction unit configured, when a predetermined condition is satisfied,
    to extract data of a measuring apparatus existing between a first control apparatus and a second control apparatus at a downstream side of the first control apparatus and, if no second control apparatus exists, a measuring apparatus existing at the downstream side of the first control apparatus, from the system configuration information, and
    to generate measuring apparatus information in which the measuring apparatus and the first control apparatus are associated with each other; and
    a control command generation unit configured:
    to acquire a measurement value from the measuring apparatus;
    to identify a control apparatus associated with the measuring apparatus that is a source of the measurement value based on the measuring apparatus information;
    to calculate a control parameter for the identified control apparatus based on the acquired measurement value; and
    to output the calculated control parameter to the identified control apparatus and to control the identified control apparatus according to the calculated control parameter,
    wherein the downstream side is a side farther from a substation or a power station, and an upstream side is a side closer to the substation or the power station.

2. The control command apparatus according to claim 1, wherein the predetermined condition is sensing of a change of the connection relationship.

3. The control command apparatus according to claim 1, wherein the predetermined condition is sensing of a failure of the control apparatus, and
    the measuring apparatus data extraction unit is configured:
    to exclude the failed control apparatus from the second control apparatus to extract the measuring apparatus data when generating the measuring apparatus information.

4. The control command apparatus according to claim 1, wherein the predetermined condition is sensing of a control apparatus having a control variable that has been outputted by the control apparatus itself and reached a control limit,
    the measuring apparatus extraction data unit is configured to exclude the control apparatus having the control variable that has reached the control limit from the second control apparatus to extract the measuring apparatus when generating the measuring apparatus information, and the control command generation unit is configured to compensate a measurement value acquired from a measuring apparatus connected to the control apparatus having the control variable that has reached the control limit to calculate the control parameter for the first control apparatus.

5. The control command apparatus according to claim 4, wherein the compensation of the measurement value includes:

calculation of a compensation value such that a control variable of the second control apparatus is a proper control variable and multiplication of the measurement value obtained from the measuring apparatus located at the downstream side of the control apparatus having the control variable that has reached the control limit by the compensation value.

6. A power system control system comprising:

a measuring apparatus;

a control apparatus;

a control command apparatus, the control command apparatus configured to generate a control parameter for the control apparatus and to transmit the control parameter to the control apparatus, and the control apparatus configured to control a voltage in a power system based on the control parameter transmitted from the control command apparatus, wherein the control command apparatus includes:

a storage unit configured to store system configuration information including a connection relationship between a control apparatus and a measuring apparatus in the power system, a measuring apparatus data extraction unit configured, when a predetermined condition is satisfied, to extract data of a measuring apparatus existing between a first control apparatus and a second control apparatus at a downstream side of the first control apparatus; and if no second control apparatus exists, a measuring apparatus existing at the downstream side of the first control apparatus, from the system configuration information, and to generate measuring apparatus information in which the measuring apparatus and the first control apparatus are associated with each other, and a control command generation unit configured to acquire a measurement value from the measuring apparatus;

to identify a control apparatus associated with the measuring apparatus that is a source of the measurement value based on the measuring apparatus information;

to calculate a control parameter for the identified control apparatus based on the acquired measurement value; and to output the calculated control parameter to the identified control apparatus and to control the identified control apparatus according to the calculated control parameter, wherein the downstream side is a side farther from a substation or a power station, and an upstream side is a side closer to the substation or the power station.

7. The power system control system according to claim 6, wherein the predetermined condition is sensing of a change of the connection relationship.

8. The power system control system according to claim 6, wherein the predetermined condition is sensing of a failure of the control apparatus, and the measuring apparatus data extraction unit is further configured to exclude the failed control apparatus from the second control apparatus to extract the measuring apparatus data when generating the measuring apparatus information.

9. The power system control system according to claim 6, wherein the predetermined condition is sensing of a control apparatus having a control variable that has been outputted by the control apparatus itself and reached a control limit;

the measuring apparatus extraction data unit is configured to exclude the control apparatus having the control variable that has reached the control limit from the second control apparatus to extract the measuring apparatus when generating the measuring apparatus information; and the control command generation unit is further configured to compensate a measurement value acquired from a measuring apparatus connected to the control apparatus having the control variable that has reached the control limit to calculate the control parameter for the first control apparatus.

10. A control command method executed by a control command apparatus, the control command apparatus generating a control parameter for a control apparatus and transmitting the control parameter to the control apparatus, the control apparatus configured to control a voltage in a power system, the control command apparatus having in a storage unit, system configuration information including a connection relationship between the control apparatus and a measuring apparatus in the power system, the method comprising:

when a predetermined condition is satisfied, extracting data of a measuring apparatus existing between a first control apparatus and a second control apparatus located at a downstream side of the first control apparatus; and if no second control apparatus exists, extracting a measuring apparatus existing at the downstream side of the first control apparatus, from the system configuration information;

generating measuring apparatus information in which the measuring apparatus and the first control apparatus are associated with each other;

acquiring a measurement value from the measuring apparatus and identifying a control apparatus associated with the measuring apparatus as a source of the measurement value, based on the measuring apparatus information;

calculating a control parameter for the identified control apparatus based on the acquired measurement value; and outputting the calculated control parameter to the identified control apparatus and controlling the identified control apparatus according to the calculated control parameter, wherein the downstream side is a side farther from a substation or a power station, and an upstream side is a side closer to the substation or the power station.

11. The control command method according to claim 10, wherein the predetermined condition is sensing of a change of the connection relationship.

12. The control command method according to claim 10, wherein the predetermined condition is sensing of a failure of a control apparatus, and the method executed by the control command apparatus further comprising excluding the failed control apparatus from the second control apparatus to extract the measuring apparatus data when generating the measuring apparatus information.

13. The control command method according to claim 10, wherein the predetermined condition is sensing of a control apparatus having a control variable that has been outputted by the control apparatus itself and reached a control limit, and the method executed by the control command apparatus further comprising:

excluding the control apparatus having the control variable that has reached the control limit from the second control apparatus to extract the measuring apparatus when generating the measuring apparatus information; and compensating a measurement value acquired from the measuring apparatus connected to the control apparatus having the control variable that has reached the control limit to calculate the control parameter for the first control apparatus.

\* \* \* \* \*